US012280483B2

(12) United States Patent
Yoshida

(10) Patent No.: US 12,280,483 B2
(45) Date of Patent: Apr. 22, 2025

(54) PNEUMATIC TOOL

(71) Applicant: MAX CO., LTD., Tokyo (JP)

(72) Inventor: Takuma Yoshida, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 17/511,409

(22) Filed: Oct. 26, 2021

(65) Prior Publication Data

US 2022/0126432 A1 Apr. 28, 2022

(30) Foreign Application Priority Data

Oct. 26, 2020 (JP) ................................ 2020-178639
Oct. 8, 2021 (JP) ................................ 2021-166353

(51) Int. Cl.
*B25C 1/04* (2006.01)

(52) U.S. Cl.
CPC .............. *B25C 1/047* (2013.01); *B25C 1/042* (2013.01)

(58) Field of Classification Search
CPC .................................. B25C 1/042; B25C 1/47
See application file for complete search history.

(56) References Cited

U.S. PATENT DOCUMENTS

2005/0247750 A1* 11/2005 Burkholder ............... B25C 1/04 227/130
2008/0185058 A1* 8/2008 Wakabayashi ............ B25C 1/04 137/613
2008/0238092 A1* 10/2008 Chen ......................... B25C 1/04 285/190
2016/0151900 A1* 6/2016 Wu ......................... B25C 1/047 227/130
2019/0270190 A1* 9/2019 Tanaka ...................... B25C 1/00
2021/0205969 A1* 7/2021 Zhu ......................... B25C 1/008

FOREIGN PATENT DOCUMENTS

JP 2015226952 A * 12/2015
JP 2016-215353 A 12/2016

OTHER PUBLICATIONS

Extended European Search Report for EP Application No. 21204682.5 dated Mar. 23, 2022. (6 pp.).

* cited by examiner

*Primary Examiner* — Tanzim Imam
(74) *Attorney, Agent, or Firm* — Banner & Witcoff, Ltd.

(57) ABSTRACT

A pneumatic tool includes a drive mechanism configured to be driven by compressed air supplied from an air intake; an air chamber configured to store the compressed air supplied; and a pressure adjusting mechanism configured to adjust the pressure of the compressed air in the air chamber. The pressure adjusting mechanism includes a valve body configured to open and close a flow path that communicates the air intake and the air chamber with each other; an elastic body configured to exert an urging force to the valve body to open the flow path; and a pressure receiving member configured to receive air pressure in the air chamber and exert an urging force in a direction of closing the flow path to the elastic body. The elastic body is arranged at a position closer to the air intake than the valve body.

6 Claims, 20 Drawing Sheets

PNEUMATIC TOOL

CROSS-REFERENCE TO RELATED APPLICATION(S)

This application is based on and claims priority under 35 USC119 from Japanese Patent Application Nos. 2020-178639 filed on Oct. 26, 2020 and 2021-166353 filed on Oct. 8, 2021, the contents of which are incorporated herein by reference.

TECHNICAL FIELD

The present disclosure relates to a pneumatic tool.

BACKGROUND ART

As a pneumatic tool using compressed air as a drive source, for example, a driving machine for driving a fastener such as a nail or a screw that engages with a workpiece such as a plate material, wood, gypsum board or steel plate is known. Compressed air, which is a drive source, is generated by, for example, an air compressor and is supplied to a driving machine via an air hose.

Such a driving machine includes, for example, a piston driven by compressed air, a driver mounted on the piston, and a cylinder accommodating the piston. When compressed air is introduced into an upper chamber of the cylinder in a state where the piston is present near the top dead center, the piston and the driver mounted on the piston can be moved toward the bottom dead center to allow the driver to drive the fastener.

Here, the pressure of the compressed air supplied via the air hose is not always constant. On the other hand, the impact force at the time of driving depends on the pressure of compressed air. Therefore, a pneumatic tool is known in which a valve mechanism for depressurizing to keep the pressure constant is provided. Further, even when the pressure of the compressed air is constant, it may be preferable to change the impact force according to the type of fastener and workpiece. Therefore, a pneumatic tool is known in which a valve mechanism for pressure regulation to adjust the pressure of the compressed air supplied is provided. The driven amount of the fastener can be adjusted by adjusting the pressure.

PTL 1 discloses a driving tool which includes a valve mechanism for adjusting the pressure of compressed air. Specifically, a driving tool is disclosed in which a pressure adjusting mechanism is provided between an accumulator chamber provided in a handle and a compressed air chamber for driving.

PTL 2 also discloses a driving tool which includes a valve mechanism for adjusting the pressure of compressed air. Specifically, a driving tool is disclosed which includes a valve body movable in a first direction to close a main flow path and in a second direction to open the main flow path, a piston connected to the valve body and having a first pressure receiving surface that receives the pressure in the first direction by compressed air and a second pressure receiving surface and a third pressure receiving surface that receive the pressure in the second direction by compressed air, and a spring that constantly urges the piston in the second direction.

CITATION LIST

Patent Literature

[PTL 1] JP2015-226952A
[PTL 2] JP2016-215353A

SUMMARY

However, in such a driving tool, the valve mechanism for depressurizing or pressure regulation (hereinafter, collectively referred to as the "valve mechanism" or the "pressure adjusting mechanism") causes an increase in the size of the driving tool. When trying to arrange the valve mechanism inside the grip of the driving tool in order to suppress the increase in size, a space in a radial direction is limited by the wall surface of the grip, and thus, a space for layout is limited. On the other hand, when the valve mechanism is arranged in the end of the grip as in the driving tools disclosed in PTL 1 and PTL 2, the air plug protrudes greatly from the driving tool, and thus, the full length of the driving tool becomes large. Therefore, an object of the present disclosure is to provide a driving tool capable of shortening its full length.

Further, the spring load of the pressure adjusting mechanism increases according to the set pressure. In a pneumatic tool such as a nailing machine that operates at a relatively high pressure, it may be difficult for a user to operate the pressure adjusting mechanism because the operating load of the pressure adjusting mechanism is large. Therefore, an object of the present disclosure is to provide a pressure regulator capable of reducing the operating load of the pressure adjusting mechanism and a pneumatic tool provided with the pressure regulator.

Further, the pressure of the compressed air supplied to the pneumatic tool may fluctuate due to various factors. In a direct-acting pressure adjusting mechanism, it is known that when a primary pressure, which is a pressure of compressed air on the upstream side of the pressure adjusting mechanism, decreases, a secondary pressure, which is a pressure of compressed air on the downstream side of the pressure adjusting mechanism, increases. Therefore, even when a desired pressure is set by the pressure adjusting mechanism, the secondary pressure may be adjusted to a pressure different from the set pressure, and the driven amount of fastener may vary. Therefore, an object of the present disclosure is to provide a pneumatic tool in which the secondary pressure is not easily affected even when the primary pressure fluctuates.

The present disclosure is a pneumatic tool including a drive mechanism configured to be driven by compressed air supplied from an air intake. The pneumatic tool includes an air chamber configured to store the compressed air supplied, and a pressure adjusting mechanism configured to adjust the pressure of the compressed air in the air chamber. The pressure adjusting mechanism includes a valve body configured to open and close a flow path that communicates the air intake and the air chamber with each other, an elastic body configured to exert an urging force to the valve body to open the flow path, and a pressure receiving member configured to receive air pressure in the air chamber and exert an urging force in a direction of closing the flow path to the elastic body. The elastic body is arranged at a position closer to the air intake than the valve body.

According to the present disclosure, it is possible to provide a driving tool capable of shortening its full length. Alternatively, according to the present disclosure, it is possible to provide a pressure regulator capable of reducing the operating load of the pressure adjusting mechanism and a pneumatic tool provided with the pressure regulator. Alternatively, it is possible to provide a pneumatic tool in which the secondary pressure is not easily affected even when the primary pressure fluctuates.

DESCRIPTION OF EMBODIMENTS

Hereinafter, embodiments of the present disclosure will be described with reference to the drawings. The following embodiments are examples for explaining the present disclosure, and the present disclosure is not intended to be limited only to the embodiments.

Figure 1:
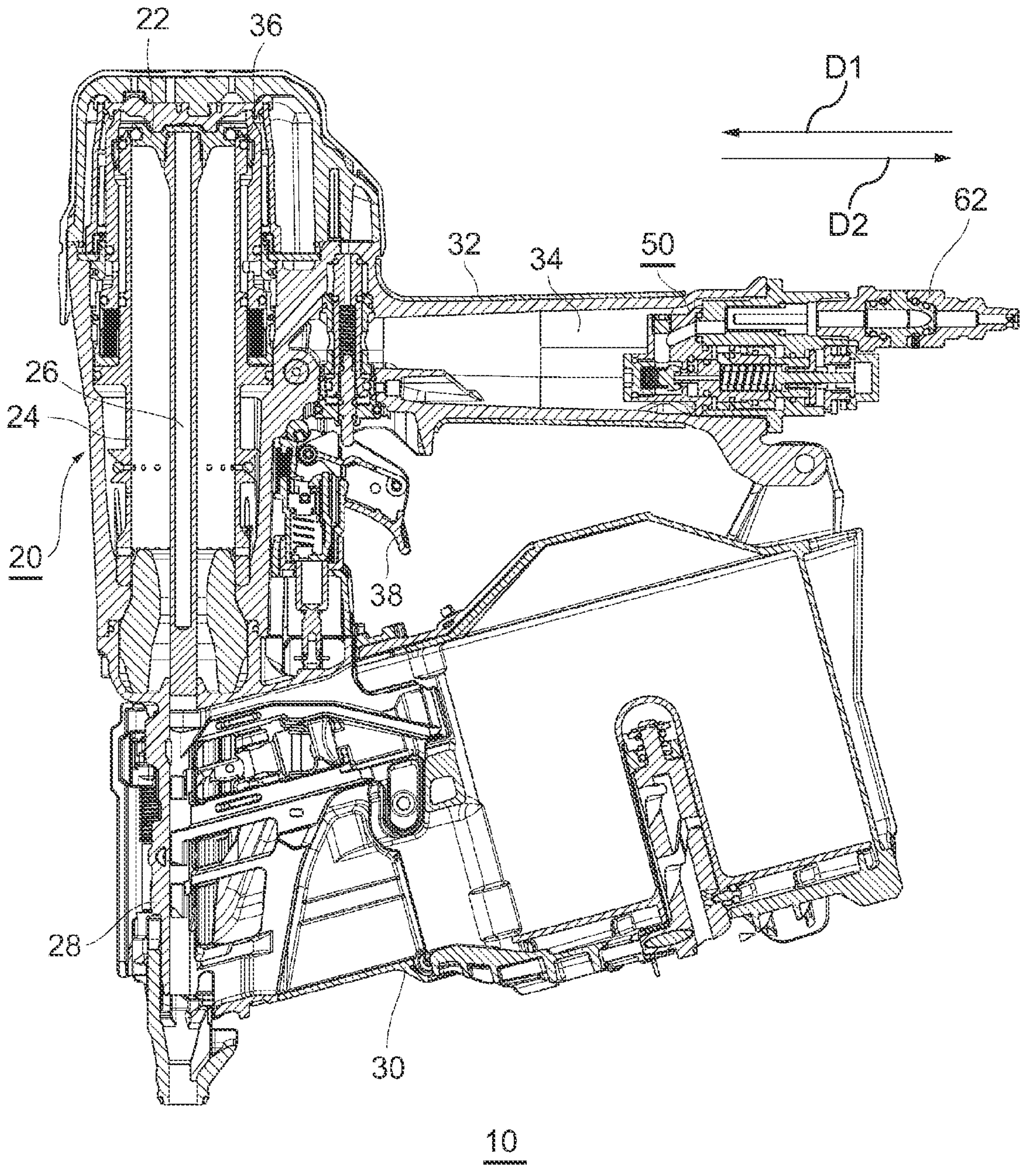
FIG. 1 is a sectional view of a nailing tool according to an embodiment.

Hereinafter, a pneumatic tool according to a first embodiment will be described. FIG. 1 is a sectional view of a nailing tool (an example of "pneumatic tool") according to the first embodiment. For convenience, an upper direction and a lower direction of the paper plane in FIG. 1 may be simply referred to as an upper direction and a lower direction, and a left direction and a right direction of the paper plane in FIG. 1 may be referred to as a first direction D1 and a second direction D2 (direction opposite to the first direction D1), respectively. In the case of a nailing tool 10 shown in FIG. 1, the side facing the second direction D2 is a grip end side of a grip 32, and the side facing the first direction D1 is a main body side.

[Example of Overall Configuration of Pneumatic Tool]

A nailing tool (an example of the "driving tool") is a pneumatic tool for driving a nail (an example of the "fastener") using compressed air as a drive source. The nailing tool 10 includes a drive mechanism 20 driven by compressed air and a regulator 50 (an example of the "pressure adjusting mechanism") for supplying compressed air to the drive mechanism 20.

The drive mechanism 20 includes a driving piston 22 that reciprocates up and down by compressed air, a cylindrical driving cylinder 24 that accommodates the driving piston 22, a driver 26 that is attached to the driving piston 22 and moves integrally with the driving piston 22 to strike a nail, a nose 28 that extends downward to allow the driver 26 to invade and strike a nail, and a magazine 30 that accommodates a nail and supplies the nail to the nose 28.

Further, the nailing tool 10 includes the grip 32 grasped by a user, an air chamber 34 provided in the grip 32, and a main valve (head valve) 36 for controlling the inflow of compressed air stored in the air chamber 34 into the driving cylinder 24. The regulator 50 depressurizes the compressed air supplied from an external air compressor via an air hose (not shown) and supplies it to the air chamber 34.

In such a nailing tool 10, when a user presses a trigger 38, the main valve 36 is opened, and the compressed air in the air chamber 34 flows into an upper chamber in the driving cylinder 24. As a result, the driving piston 22 moves downward, and the driver 26 attached to the driving piston 22 strikes a nail to drive the nail downward.

[Basic Configuration of Pressure Adjusting Mechanism]

Figure 2:
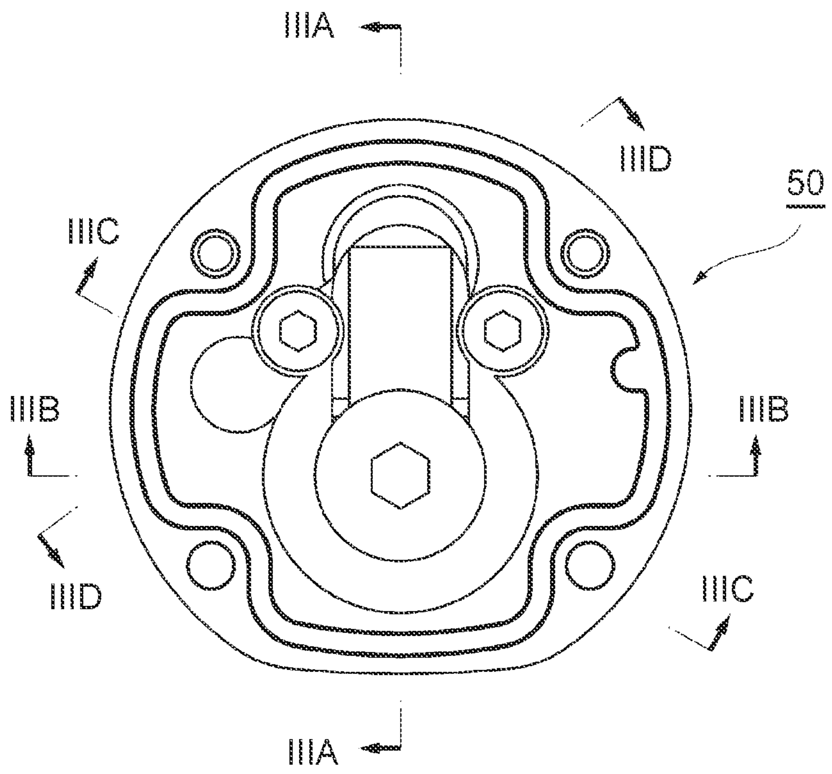
FIG. 2 is a front end view of a regulator before being assembled to the nailing tool according to the embodiment.
Figure 3A:
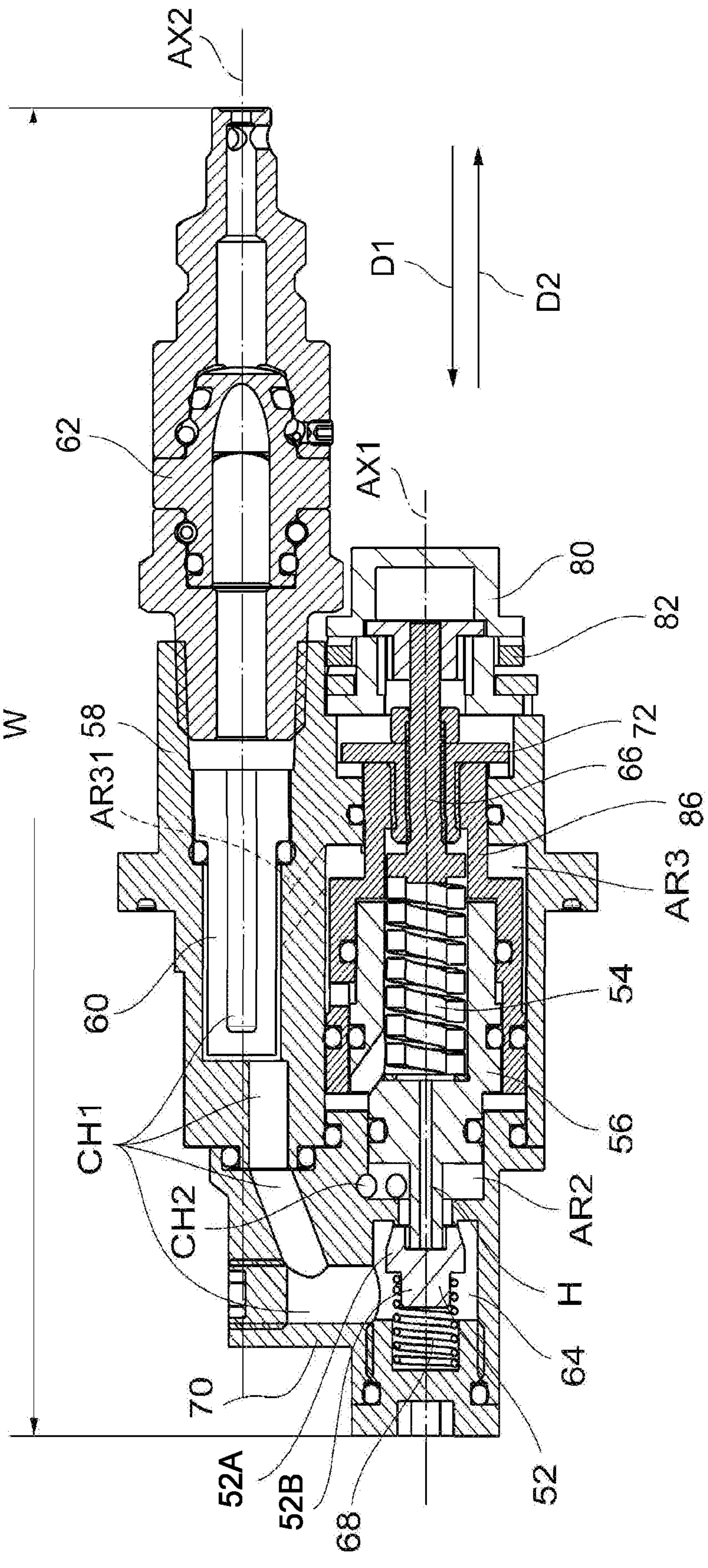
FIG. 3A is a sectional view taken along the line IIIA-IIIA in FIG. 2.
Figure 3B:
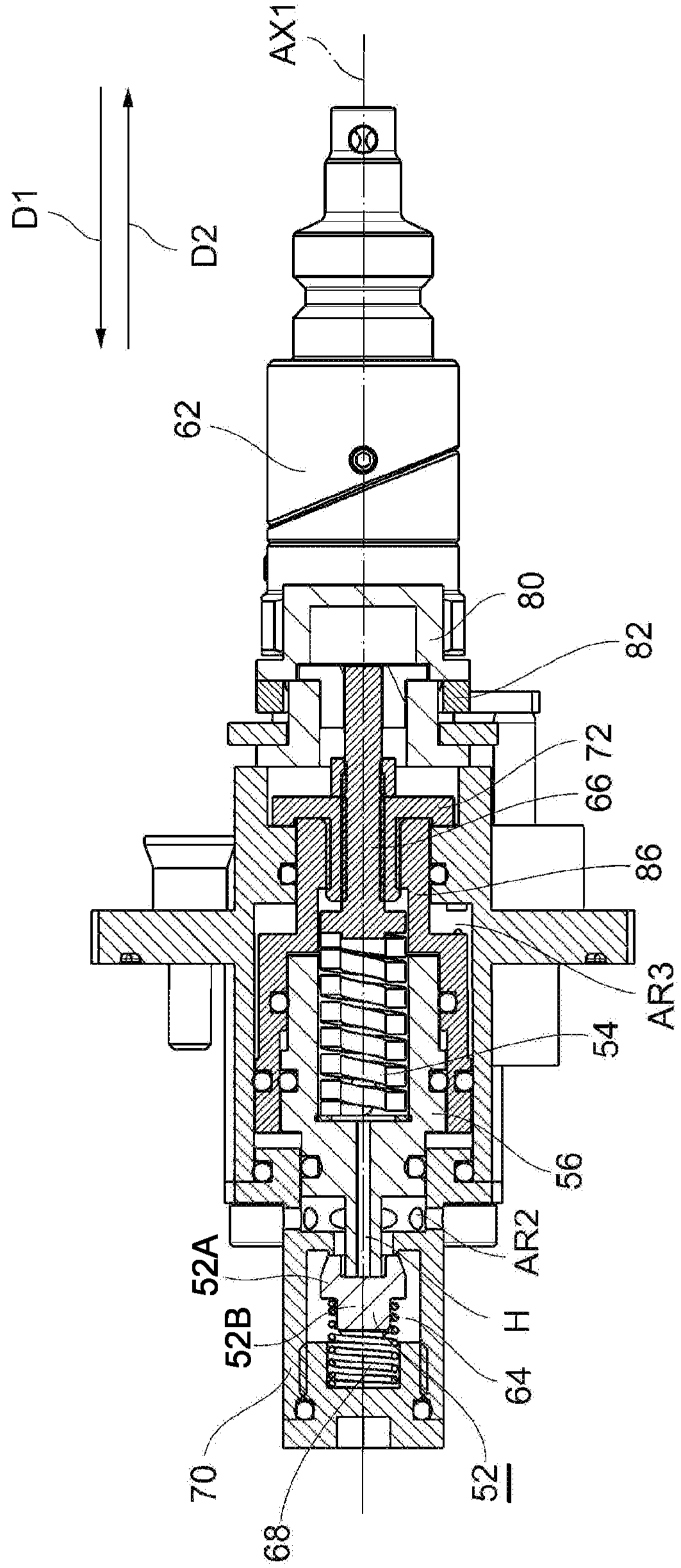
FIG. 3B is a sectional view taken along the line IIIB-IIIB in FIG. 2.
Figure 4:
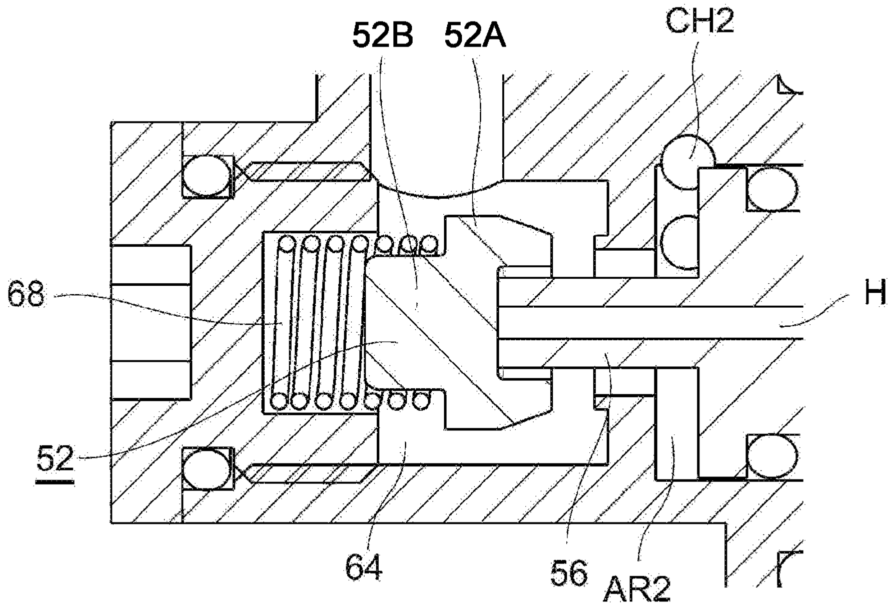
FIG. 4 is a partially enlarged view of the FIG. 3A when a valve opens in an intake direction.
Figure 5:
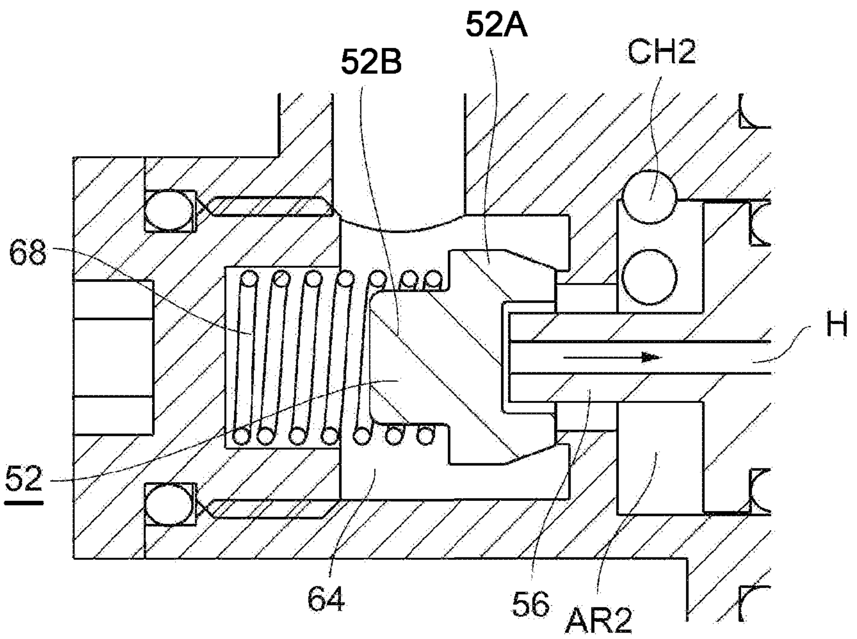
FIG. 5 is a partially enlarged view of the FIG. 3A when the valve opens in an exhaust direction.

Hereinafter, the configuration of the regulator 50 (an example of the "pressure adjusting mechanism") will be described with reference to the drawings. FIG. 2 is a front end view of the single regulator 50 before being assembled to the nailing tool 10 as viewed from the second direction D2. Meanwhile, the view after assembly corresponds to the view of the regulator 50 as viewed in the second direction D2 from the inside of the nailing tool 10 in FIG. 1. FIGS. 3A to 3D are sectional views taken along the lines IIIA-IIIA, IIIB-IIIB, IIIC-IIIC and IIID-IIID in FIG. 2, respectively. FIG. 4 is a partially enlarged view of the FIG. 3A when the compressed fluid in a valve chamber 64 flows into a secondary pressure region AR2, and FIG. 5 is a partially enlarged view of the FIG. 3A when the compressed fluid in the secondary pressure region AR2 is exhausted.

The regulator 50 includes a plug 62 (an example of the "air intake") for receiving compressed air supplied from the outside, a first end cap 58 to which the plug 62 is connected, an air filter 60 provided in the first end cap 58, a valve body 52 that is pressed in the second direction D2 by compressed air that has entered the valve chamber 64 from the first end cap 58 through a first flow path CH1, a valve spring 68 that presses the valve body 52 in the second direction D2, and a main spring 54 (an example of the "elastic body") that is arranged on the side facing the second direction D2 with respect to the valve body 52 and exerts a force on the valve body 52 toward the first direction D1.

Further, the regulator 50 includes a piston 56 (an example of the "piston component") arranged between the valve body 52 and the main spring 54, and an adjustment screw 66 (an example of the "screw component") that is arranged on the side facing the second direction D2 with respect to the main spring 54 and supports the main spring 54 by pressing an end of the main spring 54 in the first direction D1.

Meanwhile, as a pressure adjusting mechanism for changing the pressure of compressed air supplied to the drive mechanism 20 to adjust the pressure and a load reducing mechanism for reducing an operating load at the time of adjusting the pressure, the regulator 50 includes a dial 80, a spacer 72, a cam plate 82, a load release valve 84 (shown in FIG. 3C), and a load release piston 86, in addition to the adjustment screw 66. The configurations of these parts will be described in detail later.

The plug 62 is a component for receiving compressed air supplied from the outside. One end of the plug 62 is configured to allow an air hose (not shown) to be connected thereto. Therefore, the compressed air generated by the air compressor can be supplied to the plug 62 via the air hose. The other end of the plug 62 is connected to the first end cap 58. At this time, a flow path formed in the plug 62 communicates with the first flow path CH1 formed in the first end cap 58.

The plug 62 is mounted on a second axis AX2 (to be coaxial with the second axis AX2). A first axis AX1 (to be described later) and the second axis AX2 are two substantially parallel axes that are separated from each other. Further, the first axis AX1 and the second axis AX2 are parallel to the first direction D1 and the second direction D2.

The first flow path CH1 for supplying the compressed air supplied from the plug 62 into the valve chamber 64 is formed in the first end cap 58 to which the plug 62 is attached and in the parts from the first end cap 58 to the valve chamber 64 in which the valve body 52 is disposed. As shown in FIG. 3A, the valve chamber 64 is arranged at a position advanced in the first direction D1 from an end of the first end cap 58 in the second direction D2 and on the first axis AX1 that is vertically spaced from the second axis AX2. Therefore, the first flow path CH1 has a portion for advancing the compressed air in the first direction D1 and a portion for advancing the compressed air from the second axis AX2 to the first axis AX1.

The portion of the first flow path CH1 in the present embodiment for advancing the compressed air in the first direction D1 includes a flow path formed on the second axis AX2. However, the portion of the first flow path CH1 for advancing the compressed air in the first direction D1 does not necessarily have to be formed on the second axis AX2 parallel to the first direction D1, and may be formed to form an acute angle with respect to the first direction D1, for example.

The valve body 52 is a component for adjusting, together with the piston 56, the secondary pressure on the downstream side of the valve body 52. Specifically, when the secondary pressure on the downstream side drops, the valve body 52 moves in the first direction D1 to allow the compressed fluid on the upstream side having the primary pressure to flow into the downstream side, thereby raising the secondary pressure up to a predetermined pressure. Here, the primary pressure refers to the pressure on the upstream side of the valve body 52. Further, the secondary pressure refers to the pressure on the downstream side of the valve body 52.

As shown in FIG. 3A and the like, the valve body 52 according to the present embodiment has a cylindrical portion 52B located on the side facing the first direction D1 and formed in a cylindrical shape, and a truncated conical portion 52A formed integrally with the cylindrical portion 52B and located on the side facing the second direction D2. The truncated conical portion 52A is formed in a truncated conical shape whose bottom surface has a diameter larger than that of the cylindrical portion 52B. Further, a hole portion extending from an apex surface of the truncated conical portion 52A toward the cylindrical portion 52B is formed in the truncated conical portion 52A.

Of the apex surface of the truncated conical portion 52A formed in a circular shape, an outer edge portion is supported on a valve seat, and a region on the center side of the outer edge portion and a surface of the hole portion are exposed to the compressed fluid having the secondary pressure. The other portions of the valve body 52, that is, at least each bottom surface and each side surface of the cylindrical portion 52B and the truncated conical portion 52A are exposed to the compressed fluid having the primary pressure.

The valve body 52 is arranged on the first axis AX1 in the valve chamber 64 (to be coaxial with the first axis AX1). Since the first flow path CH1 communicates with the valve chamber 64, the compressed fluid having the primary pressure exists in the valve chamber 64. Since a bottom surface of the valve body 52 facing the first direction D1 (an example of the "first pressure receiving surface exposed to the primary pressure region") is exposed to the space in the valve chamber 64, the valve body 52 is pressed in the second direction D2 by the compressed fluid having the primary pressure.

Further, as shown in FIG. 3A, the valve body 52 is supported by the valve spring 68, which is a compression spring arranged on the side facing the first direction D1 with respect to the valve body 52. Therefore, the valve body 52 is pressed in the second direction D2 by an urging force according to a compression amount of the valve spring 68 and a pressure of the compressed fluid having the primary pressure exposed on the surface of the valve body 52 facing the first direction D1. Meanwhile, the valve spring 68 is arranged to surround the cylindrical portion 52B in a cylindrical space provided in a component attached to a second end cap 70 provided at an end of the regulator 50 in the first direction D1. An end of the valve spring 68 engages with a bottom surface of the truncated conical portion 52A.

On the other hand, the apex surface of the valve body 52 facing the second direction D2 is pressed in the first direction D1 by the piston 56 and the valve seat supporting the valve body 52. Since the piston 56 is pressed in the first direction D1 by the main spring 54, it can be said that the main spring 54 presses the valve body 52 in the first direction D1 via the piston 56. Further, a part of the apex surface of the valve body 52 is exposed to the secondary pressure region AR2. Therefore, the valve body 52 is pressed in the first direction D1 by an urging force according to a compression amount of the main spring 54 and a pressure of the compressed fluid having the secondary pressure exposed on the surface of the valve body 52 facing the second direction D2. In addition, the valve body 52 is configured such that its movement in the second direction D2 is restricted by the valve seat. The pressure regulation action by a mechanism including such a valve body 52 will be described in detail later.

In an equilibrium state where the secondary pressure becomes a predetermined pressure, a part of the apex surface of the valve body 52 is in close contact with the valve seat, so that the valve chamber 64 (an example of the "primary pressure region") and the secondary pressure region AR2, which is a region on the side facing the second direction D2 with respect to the valve body 52, do not communicate with each other. However, when the secondary pressure drops, the valve body 52 moves away from the valve seat in the first direction D1 as described later (see FIG. 4), so that the valve chamber 64 and the secondary pressure region AR2 on the downstream side communicate with each other and the compressed fluid having the primary pressure flows into the downstream side. As a result, the secondary pressure can be increased.

The piston 56 transmits the urging force by the main spring 54 to the valve body 52 and presses the valve body 52 in the first direction D1. Further, when the secondary pressure rises above the predetermined pressure, the compressed fluid in the secondary pressure region AR2 is exhausted and the secondary pressure is lowered.

The piston 56 is arranged on the first axis AX1 (to be coaxial with the first axis AX1). Since the secondary pressure region AR2 communicates with a second flow path CH2 (an example of the "secondary pressure flow path") for supplying compressed fluid to the drive mechanism 20 and a surface of the piston 56 facing the first direction D1 (an example of the "second pressure receiving surface exposed to the secondary pressure region") is exposed to the secondary pressure region AR2, the piston 56 is pressed in the second direction D2 by the compressed fluid having the secondary pressure. That is, the second pressure receiving surface is pressed in a direction of closing the flow paths CH1, CH2 by receiving air pressure in the air chamber 34.

Further, a cylindrical space (spring seat) centered on the first axis AX1 is provided at an end of the piston 56 in the second direction D2. The main spring 54 is arranged in the cylindrical space. The piston 56 is pressed in the first direction D1 by the main spring 54, which is a compression spring. Meanwhile, the cylindrical space is maintained at atmospheric pressure.

Furthermore, an end of the piston 56 in the first direction D1 extends in a cylindrical shape with the first axis AX1 as a central axis and comes into contact with the apex surface of the valve body 52. A through-hole H communicating with the cylindrical space maintained at atmospheric pressure is formed in the portion extending in the cylindrical shape.

In the equilibrium state where the secondary pressure becomes the predetermined pressure, the urging force from the main spring 54 that exerts a force on the piston 56 toward the first direction D1 and the force received from the valve body 52 and the compressed air having the secondary pressure that exerts a force toward the second direction D2 are balanced. Therefore, the piston 56 does not move.

However, when the secondary pressure drops below the predetermined pressure, the force of the compressed air having the secondary pressure for pressing the piston 56 in the second direction D2 on the second pressure receiving surface decreases, so that the piston 56 and the valve body 52 pressed by the piston 56 move in the first direction D1. Therefore, the valve configured by the valve body 52 is opened in an intake direction (see FIG. 4). In this way, the valve chamber 64, which is the primary pressure region, and the secondary pressure region AR2 communicate with each other, and the compressed air having the primary pressure flows into the downstream side, so that the secondary pressure can be increased. When the secondary pressure rises to the predetermined pressure, the valve body 52 returns in the second direction D2 and the valve is closed, so that an equilibrium state is obtained.

On the other hand, when the secondary pressure rises above the predetermined pressure, the force of the compressed air having the secondary pressure for pressing the second pressure receiving surface of the piston 56 in the second direction D2 increases, so that the piston 56 moves in the second direction D2. Therefore, a slight gap is formed between the piston 56 and the valve body 52, which does not move in the second direction D2 by being restrained by the valve seat (see FIG. 5).

Since the through-hole H is formed in the portion of the piston 56 extending in a cylindrical shape, at this time, the valve configured by the valve body 52 is opened in an exhaust direction, and the compressed air in the secondary pressure region AR2 is exhausted to a space maintained at atmospheric pressure via the through-hole H, as indicated by the arrow in FIG. 5. In this way, the secondary pressure can be reduced. When the secondary pressure is reduced to the predetermined pressure, the piston 56 returns in the first direction D1 and is in an equilibrium state. With the above operation, the regulator 50 is configured to be able to maintain the secondary pressure at the predetermined pressure. For example, the predetermined pressure of the secondary pressure is set to 2.3 MPa. However, the present disclosure can be applied to a pressure adjusting mechanism having other configurations.

The main spring 54 presses the valve body 52 in the first direction D1 via the piston 56. The main spring 54 is arranged on the first axis AX1 (to be coaxial with the first axis AX1). Since it is necessary to move the valve body 52 pressed in the second direction D2 by the valve spring 68 in the first direction D1 when the secondary pressure is reduced, the main spring 54 is configured to be able to press the valve body 52 with a stronger force than the valve spring 68.

An end of the main spring 54 in the first direction D1 is in contact with the piston 56, and an end thereof in the second direction D2 is supported by the adjustment screw 66. Therefore, an initial load of the main spring 54 can be adjusted by changing the position of the adjustment screw 66 or by inserting a washer or the like between the adjustment screw 66 and the main spring 54.

The adjustment screw 66 presses the main spring 54 in the first direction D1. Further, the adjustment screw 66 is arranged on the first axis AX1 (to be coaxial with the first axis AX1). That is, the valve body 52, the piston 56, the main spring 54, and the adjustment screw 66 are arranged in this order on the first axis AX1 in the second direction D2 toward the outside of the nailing tool 10. In addition, the plug 62 and at least a part of the first flow path CH1 are arranged on the second axis AX2.

Therefore, the position of the end of the main spring 54 in the second direction D2 can be easily adjusted by removing the dial 80 and changing the position of the adjustment screw 66 or by inserting a washer or the like. A malfunction of a pneumatic tool will occur when the initial load of the main spring 54 is shifted to the lower pressure side, and the amount of the compressed air consumed by the drive mechanism is increased when the initial load of the main spring 54 is shifted to the high pressure side. Thereby, the merit of installing a regulator will be diminished. However, according to the nailing tool 10 of the present embodiment, the adjustment screw 66 is arranged on the outer side of the valve body 52, the piston 56 and the main spring 54, so that the initial load of the main spring 54 can be easily adjusted. Therefore, it is possible to improve the assembling property of the nailing tool 10.

That is, since each spring has a characteristic that a variation in load characteristic is large, as described above, simply assembling a regulator will result in mounting a regulator with different load characteristics for each pneumatic tool. Therefore, after assembling a regulator, the variation in load characteristic of the regulator is eliminated by inserting a washer or by adjusting a screw for adjusting the initial load.

Since the contact state between one end of the spring and the piston must be maintained at the time of adjusting the load characteristic, it is necessary to provide the pressure adjusting mechanism on the other end side of the spring. However, in the case of a pneumatic tool in the related art, a spring is provided on the inner side of a pneumatic tool than a piston, and thus, a pressure adjusting mechanism is also provided on the inner side of a pneumatic tool than a piston. In order to operate the pressure adjusting mechanism in such a situation, it is conceivable to expose an operating part of the pressure adjusting mechanism from the pneumatic tool. However, for that purpose, it is necessary to form a hole in a grip used as an air chamber, which is not realistic.

In the nailing tool 10 according to the present embodiment, the main spring 54, which is an elastic body, is arranged outside the valve body 52, that is, at a position close to the air intake, so that the variation in load characteristic of the main spring 54 can be easily adjusted.

Further. the valve body 52, the piston 56 and the main spring 54 are arranged on the first axis AX1, while the plug 62 upstream of the valve body 52 is arranged on the second axis AX2 different from the first axis AX1. As a result of such a configuration, the plug 62 can be moved to the first direction side as compared with the conventional case, and only the end of the plug 62 in the second direction D2, not the entire plug 62, can be arranged to protrude from the other portion of the nailing tool 10 (see FIG. 1).

At this time, in the first direction D1, the region where the main spring 54 is provided (region from the end of the main spring 54 in the first direction D1 to the end of the main spring 54 in the second direction D2) and the region where the first flow path CH1 is provided are at least partially overlapped. Especially, in the case of the regulator 50 shown in the present embodiment, in the first direction D1, the region where the main spring 54 is provided and the region where the piston 56 is provided are included in the region where the first flow path CH1 is provided (from the end of the first end cap 58 in the second direction D2 to the end of the flow path reaching the valve chamber 64 in the first direction D1). As a result of such a configuration, the full length W (shown in FIG. 3A) of the regulator 50 in the first direction D1 can be made smaller than that of the regulator in the related art. That is, the amount of protrusion of the plug 62 can be suppressed, and the full length of the nailing tool 10 can be shortened.

Further, since there is a margin in the region on the second axis AX2, the large air filter 60 can be provided on the second axis AX2 (to be coaxial with the second axis AX2), as shown in FIG. 3A. As a result, it is possible to reduce the possibility that the regulator 50 cannot operate normally due to dust being mixed inside the regulator 50 and meshing with the valve body 52 or the like. However, the air filter 60 may be omitted or miniaturized, and the plug 62 may be additionally arranged on the side facing the first direction D1.

[Load Reducing Mechanism]

Hereinafter, the pressure adjusting mechanism and the load reducing mechanism included in the regulator 50 will be described with reference to FIGS. 6A to 9. The pressure adjusting mechanism allows the regulator 50 to adjust the secondary pressure. Therefore, the impact force of the nailing tool 10 can be changed according to the type of fastener and workpiece. Further, the load reducing mechanism according to the present embodiment makes it possible to temporarily reduce the load applied to a user when adjusting the pressure.

First, the outline of each mechanism will be described, and then the specific configuration of each mechanism will be described. The pressure adjusting mechanism further includes the dial 80, the spacer 72, and the adjustment screw 66, in addition to the valve body 52, the main spring 54, and the pressure receiving member described above. Further, the load reducing mechanism includes the cam plate 82, the load release valve 84, and the load release piston 86.

The load release piston 86 is an example of a support part that supports the end of the main spring 54 in the second direction D2, and is located on the side facing the second direction D2 with respect to the piston 56. The load release piston 86 can move relative to the piston 56. When an operation is input to an operation input part such as the dial 80, the load release piston 86 moves to the side facing the second direction D2 opposite to the side facing the first direction D1 where the valve body 52 is located.

When a user turns the dial 80 (an example of the "operation input part"), the pressure adjusting mechanism changes the position of the "support part," which is a component that defines the position of the end of the main sparing 54 in the second direction D2. The amount of compression of the main spring 54 varies according to the position of the end of the main spring 54 in the second direction D2. Therefore, the secondary pressure can be adjusted by changing the position of the load release piston 86. In the present embodiment, by providing a slope at the contact portion between the spacer 72 rotating together with the dial 80 and the first end cap 58, the position of the spacer 72 with respect to the first end cap 58 is displaced in an axial direction according to the rotation position of the dial 80 (the spacer 72).

Since the component that defines the position of the end of the main spring 54 in the second direction D2 is integrally formed with the spacer 72, the position of the end of the main spring 54 in the second direction D2 can be displaced by operating the dial 80 and the spring force of the main spring 54 can be adjusted. Further, since the spacer 72 is integrally formed with the load release piston 86, an axial force of the load release piston 86 in the first direction D1 generates a force for pressing, in the direction (first direction D1) of compressing the main spring 54, the component that defines the position of the end of the main spring 54 in the second direction D2.

The load reducing mechanism extends the main spring 54 when the dial 80 is turned. When the main spring 54 is extended, the urging force acting on the adjustment screw 66 from the main spring 54 can be weakened, so that the operating load at the time of adjusting the pressure can be reduced. In the present embodiment, the load release piston 86 is normally pressed in the first direction by exposing the surface of the load release piston 86 facing the second direction D2 to a load release region AR3, which is the primary pressure region. The load release region AR3 is a closed space facing the load release piston 86 and defined on the side (the side facing the second direction D2) opposite to the valve body 52 with the load release piston 86 interposed therebetween.

When the dial 80 is turned, the load release valve 84 that follows the operation of the dial 80 causes the load release region AR3 to be opened to atmospheric pressure or to be depressurized. As a result, the load release piston 86 can move in the second direction D2, so that the main spring 54 can be extended to its natural length or near the natural length. Therefore, the urging force acting on the adjustment screw 66 from the main spring 54 can be weakened. Since the adjustment screw 66 is engaged with the dial 80, it is possible to reduce the load applied to the user when the dial 80 is turned. The specific configuration will be outlined below.

Figure 3C:
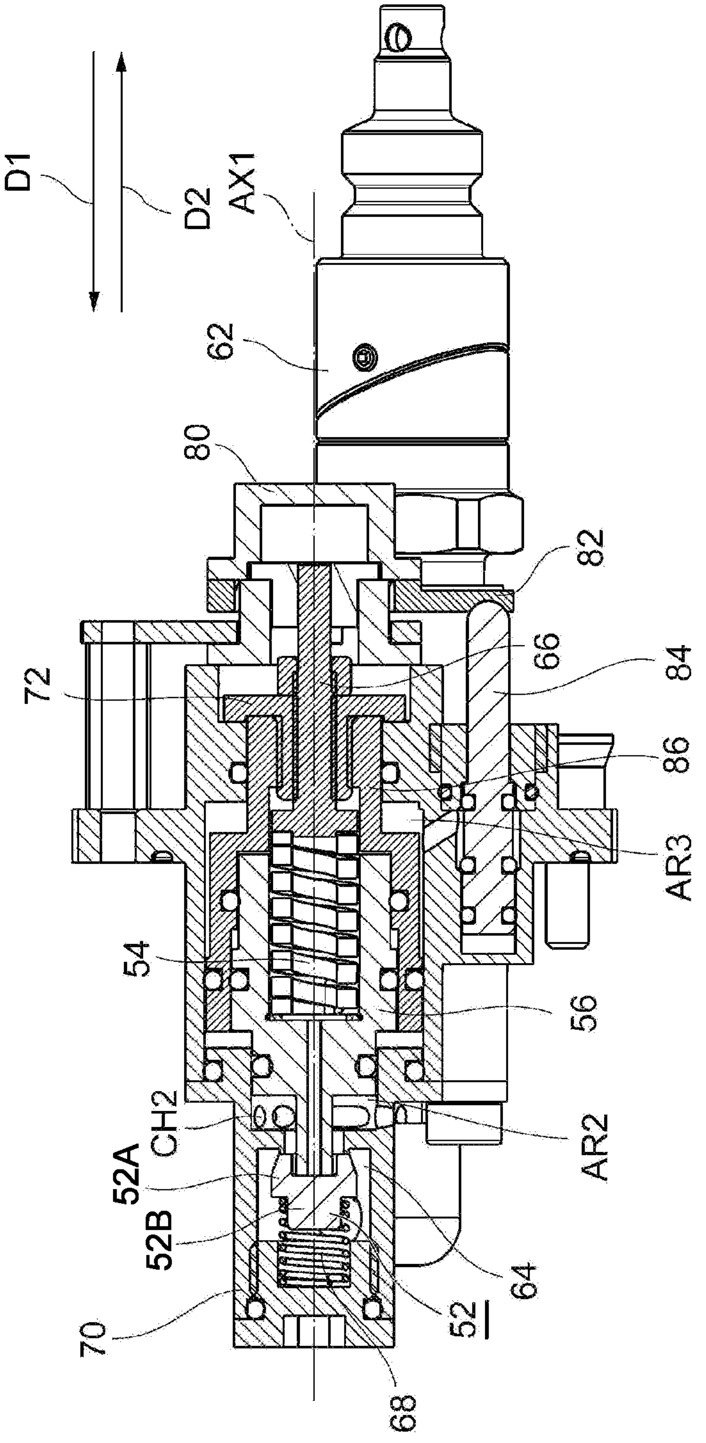
FIG. 3C is a sectional view taken along the line IIIC-IIIC in FIG. 2.
Figure 3D:
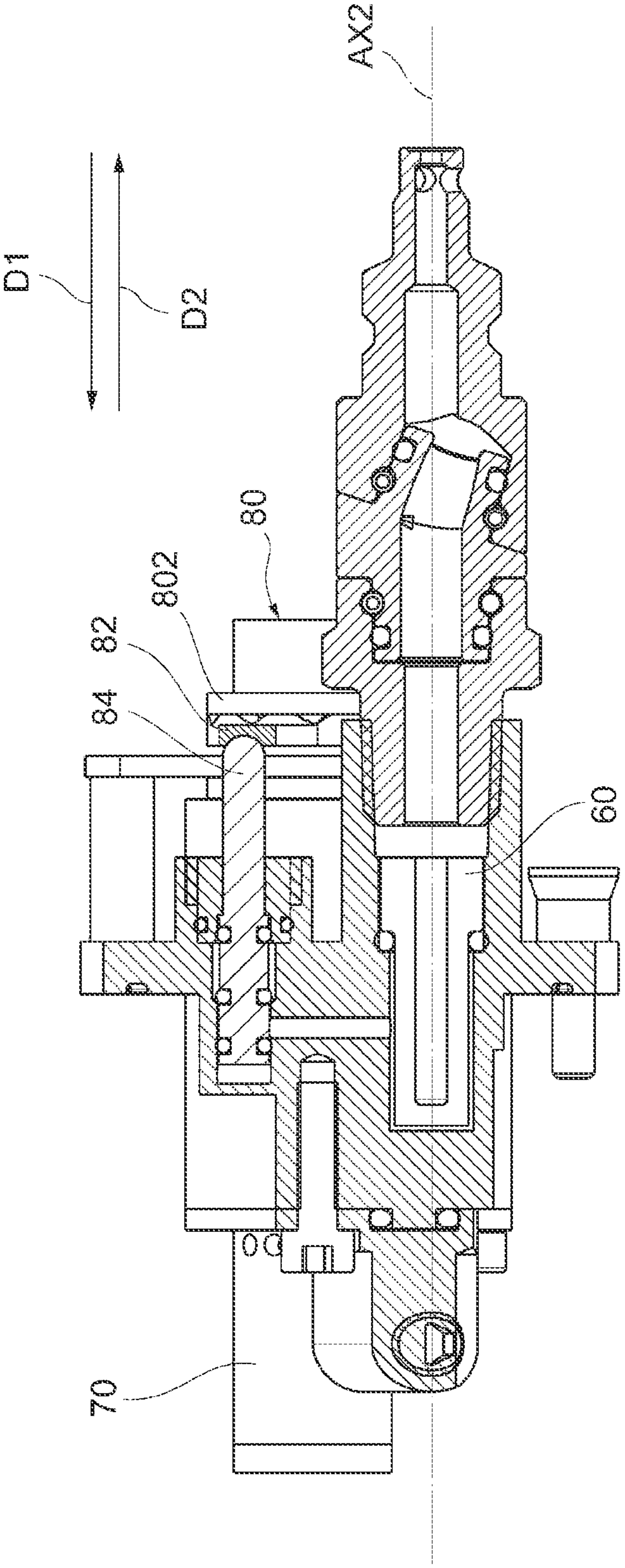
FIG. 3D is a sectional view taken along the line IIID-IIID in FIG. 2.
Figure 6A:
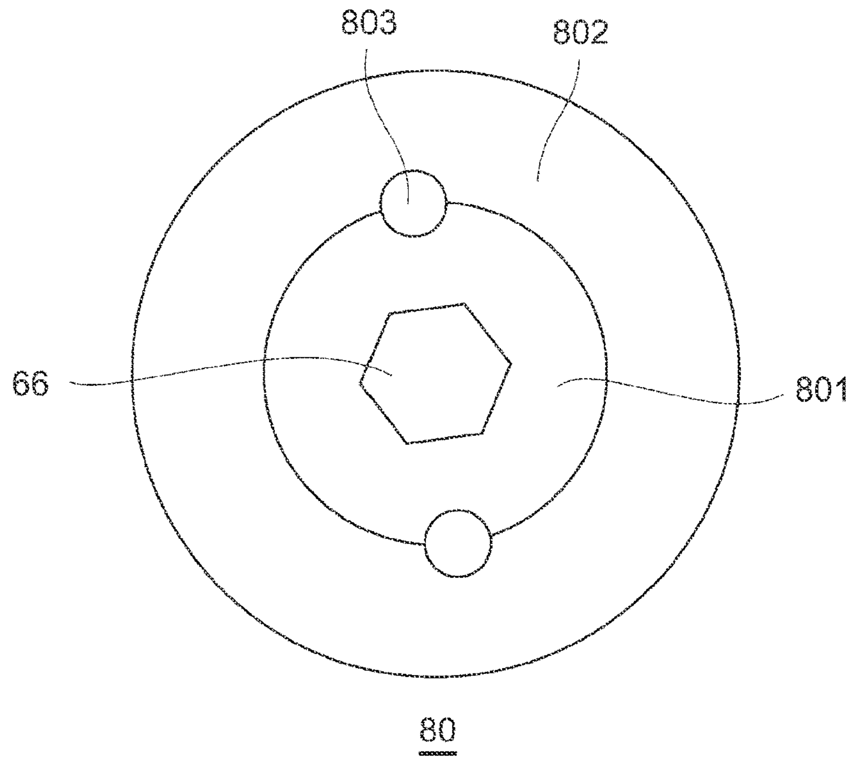
FIG. 6A is an enlarged view of a dial shown in FIG. 3C as viewed from a first direction.
Figure 6B:
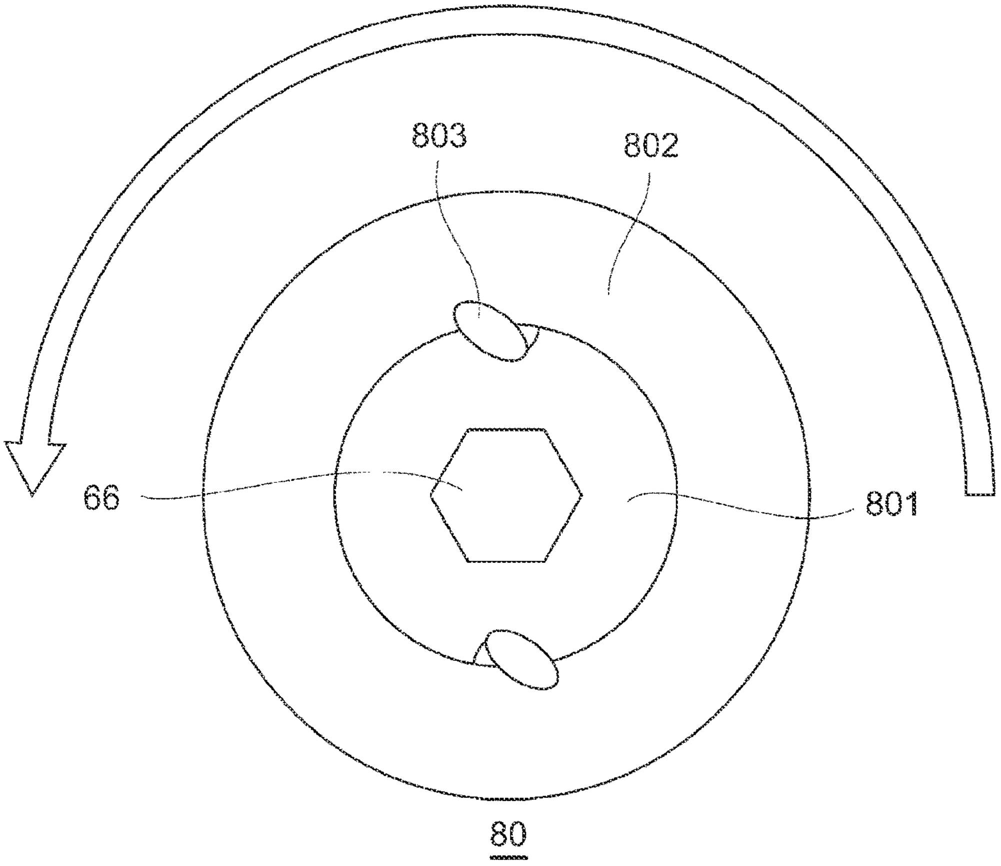
FIG. 6B is an enlarged view showing a state in which an operation is input to the dial shown in FIG. 6A.

FIG. 6A is an enlarged view of the dial 80 shown in FIG. 3C as viewed from the first direction D1. FIG. 6B is an enlarged view showing a state in which an operation is input by rotating the dial 80 shown in FIG. 6A. As shown in FIGS. 6A and 6B, the dial 80 is configured to be rotatable about the first axis AX1. The dial 80 includes an inner dial 801 formed in a substantially disk shape, an outer dial 802 surrounding the inner dial 801 from the outside in a radial direction, and an elastic member 803 connecting the inner dial 801 and the outer dial 802. The elastic member 803 is formed of, for example, rubber or the like to have a columnar shape. Concave portions for accommodating the elastic member 803 are formed on an outer peripheral surface of the inner dial 801 and an inner peripheral surface of the outer dial 802.

The inner dial 801 is fixed to the adjustment screw 66 described above and is fixed to the load release piston 86 via the adjustment screw 66. In a state where the load release valve 84 (to be described later) is not opened, the urging force acting on the inner dial 801 from the main spring 54 is large. Therefore, when pinching the outer dial 802 to rotate the dial 80, the inner dial 801 having a large rotational resistance does not rotate, whereas only the outer dial 802 rotates with respect to the inner dial 801 while elastically deforming the elastic member 803.

Figure 7:
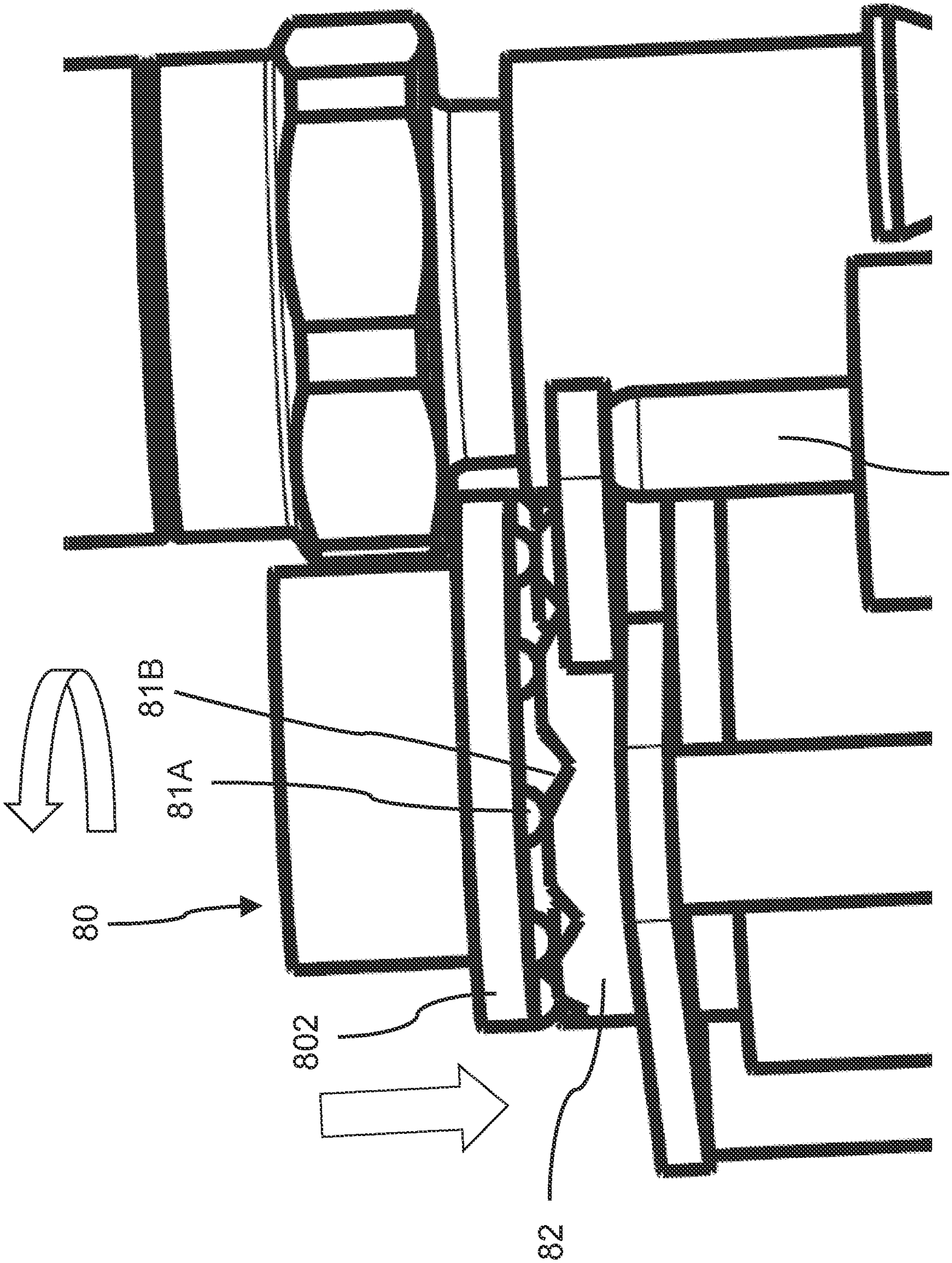
FIG. 7 is a perspective view of the dial shown in FIG. 6B as viewed obliquely.

FIG. 7 is a perspective view of the dial 80 shown in FIG. 6B as viewed obliquely. As shown in FIG. 7, the dial 80 is in contact with the cam plate 82. The dial 80 is configured so that the cam plate 82 is displaced in the first direction D1 when the outer dial 802 of the dial 80 is rotated. Specifically, on the surface of the outer dial 802 in contact with the cam plate 82, a plurality of convex portions 81A are periodically provided to be rotationally symmetrically about the first axis AX1.

On the other hand, on the surface of the cam plate 82 in contact with the outer dial 802, a plurality of concave portion 81B are provided in the same period to be rotationally symmetrically about the first axis AX1. With this configuration, as the outer dial 802 rotates, the position of the cam plate 82 in the first direction D1 can be displaced depending on whether the convex portions 81A and the concave portions 81B face each other or not.

As shown in FIG. 7, the cam plate 82 is in contact with an end of the load release valve 84 in the second direction D2. Therefore, the load release valve 84 is displaced in the first direction D1 with the displacement of the cam plate 82 in the first direction D1. The load release valve 84 is switched from a valve closed state to a valve opened state when it is displaced in the first direction D1

In the valve closed state before movement, an O-ring 84A of the load release valve 84 is pressed against a cylindrical inner wall surface opposing thereto. Therefore, the load release region AR3 and a depressurized flow path AR32 communicating with the load release region AR3 are sealed with respect to an open region AR4 opening to atmospheric pressure. Since the load release region AR3 communicates with the first flow path CH1 by a pressurized flow path AR31 (see FIG. 3A), the load release region AR3 and the depressurized flow path AR32 are maintained at the primary pressure. When the load release valve 84 is displaced in the first direction D1 by the cam plate 82, the load release valve 84 is switched from the valve closed state to the valve opened state, and the load release region AR3 is opened to atmospheric pressure or depressurized.

Figure 8:
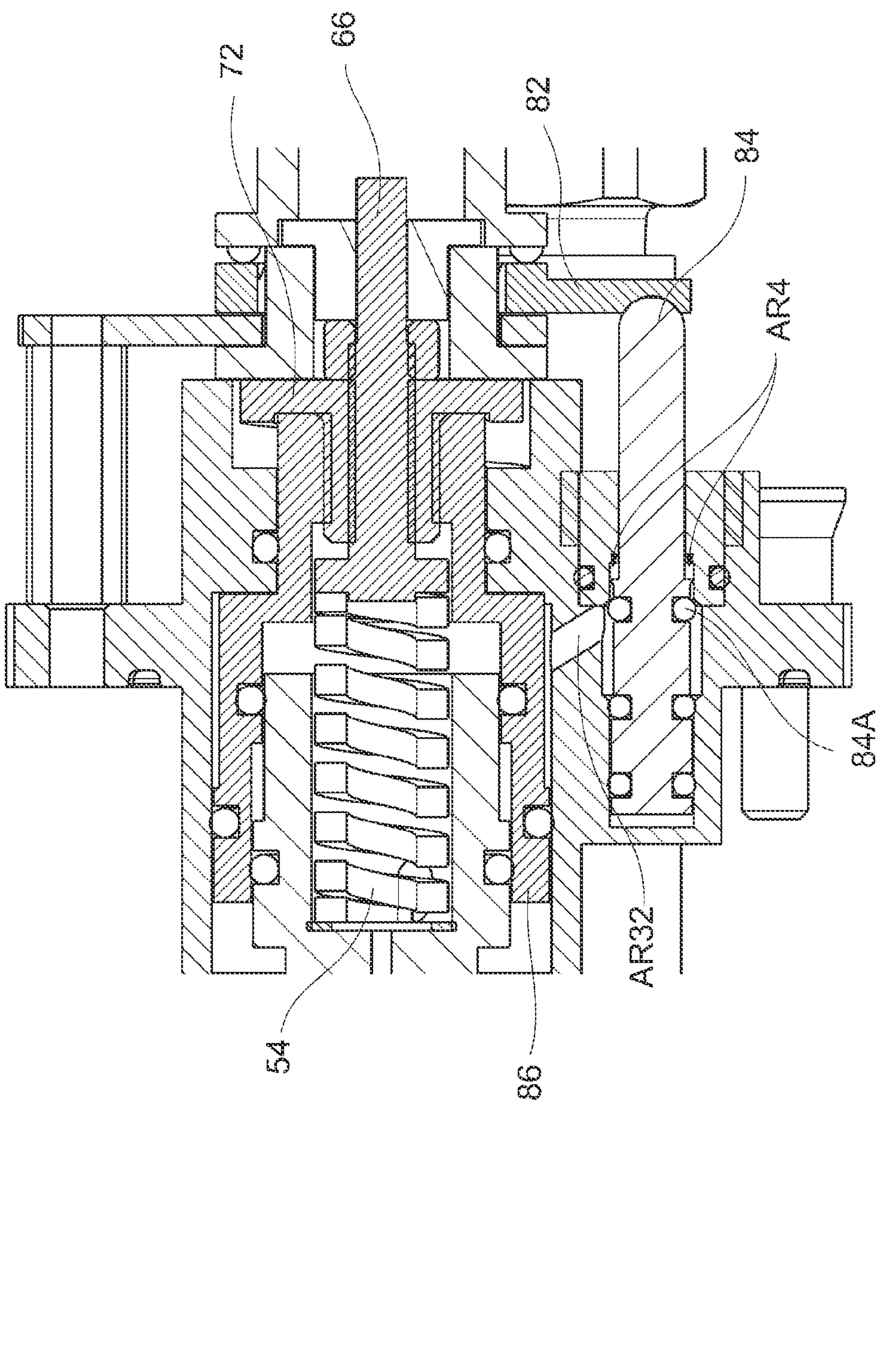
FIG. 8 is a partially enlarged view of the FIG. 3A when a main spring is extended to its natural length in a valve opened state.

FIG. 8 is a partially enlarged view of the FIG. 3A when the main spring 54 is extended to its natural length in the valve opened state. As shown in FIG. 8, the cylindrical inner wall surface facing the load release valve 84 is formed to have a slightly larger diameter so as not to sufficiently contact with the O-ring 84A when the load release valve 84 moves in the first direction D1. Therefore, when the load release valve 84 moves in the first direction D1, the load release region AR3 and the depressurized flow path AR32 communicating with the load release region AR3 are in the valve opened state where they are not completely sealed with respect to the open region AR4 opening to atmospheric pressure and communicate with the open region AR4.

As a result, the compressed air in the load release region AR3 that is pressing the load release piston 86 in the first direction D1 is exhausted, and the load release piston 86 is in a state of being movable in the second direction D2. Therefore, the main spring 54 extends while moving the load release piston 86 in the second direction D2. In this way, the urging force acting on the adjustment screw 66 from the main spring 54 can be weakened.

When the urging force of the main spring 54 acting on the inner dial 801 described above is weakened, the rotational resistance of the inner dial 801 is greatly reduced. Due to the restoring force of the elastic member 803 that is elastically deformed as shown in FIG. 6B, the inner dial 801 rotates to the same position as the outer dial 802 and returns to the state shown in FIG. 6A. In this way, when the convex portions and the concave portions face each other again, the cam plate 82 is displaced in the second direction D2. As a result, the load release valve 84 is also displaced in the second direction D2 and returns to its initial position. Meanwhile, a compression spring for urging the load release valve 84 in the second direction D2 may be provided at an end of the load release valve 84 in the first direction D1.

When the load release valve 84 is displaced in the second direction D2 and returns its original position, the load release region AR3 and the depressurized flow path AR32 communicating with the load release region AR3 are sealed again with respect to the open region AR4 opening to atmospheric pressure. Since the load release region AR3 communicates with the first flow path CH1 by the pressurized flow path AR31 shown in FIG. 3A, the load release region AR3 rises to the primary pressure. As a result, the load release piston 86 is displaced in the first direction D1.

As a result, the main spring 54 is compressed, and the piston 56 supported by the load release piston 86 at the end in the second direction D2 is pressed in the first direction D1 by the main spring 54. In the illustrated example, the spacer 72 and the load release piston 86 are configured as an integral structure. The spacer 72 and the load release piston 86 may be formed separately and fixed to each other. When the load release region AR3 rises to the primary pressure, the load release piston 86 moves in the first direction D1 together with the spacer 72.

The position of the end of the main spring 54 in the second direction D2 is also displaced in the first direction D1, but at this time, the slope provided on the spacer 72 rotating with the dial 80 comes into contact with the first end cap 58 to determine the amount of displacement of the load release piston 86 in the first direction D1. That is, the distance between the spacer 72 and the first end cap 58 can be adjusted by rotating the dial 80. Therefore, it is possible to adjust the pressure by weakening the compressive force of the main spring 54. Further, the present disclosure is not limited to a structure in which the amount of displacement can be adjusted steplessly by the slope, and an engaging portion may be formed in a stepped shape to adjust the amount of displacement in a stepwise manner. When an inclination angle of the slope is increased, the amount of displacement can be increased when the dial 80 is rotated by a predetermined angle.

Figure 9:
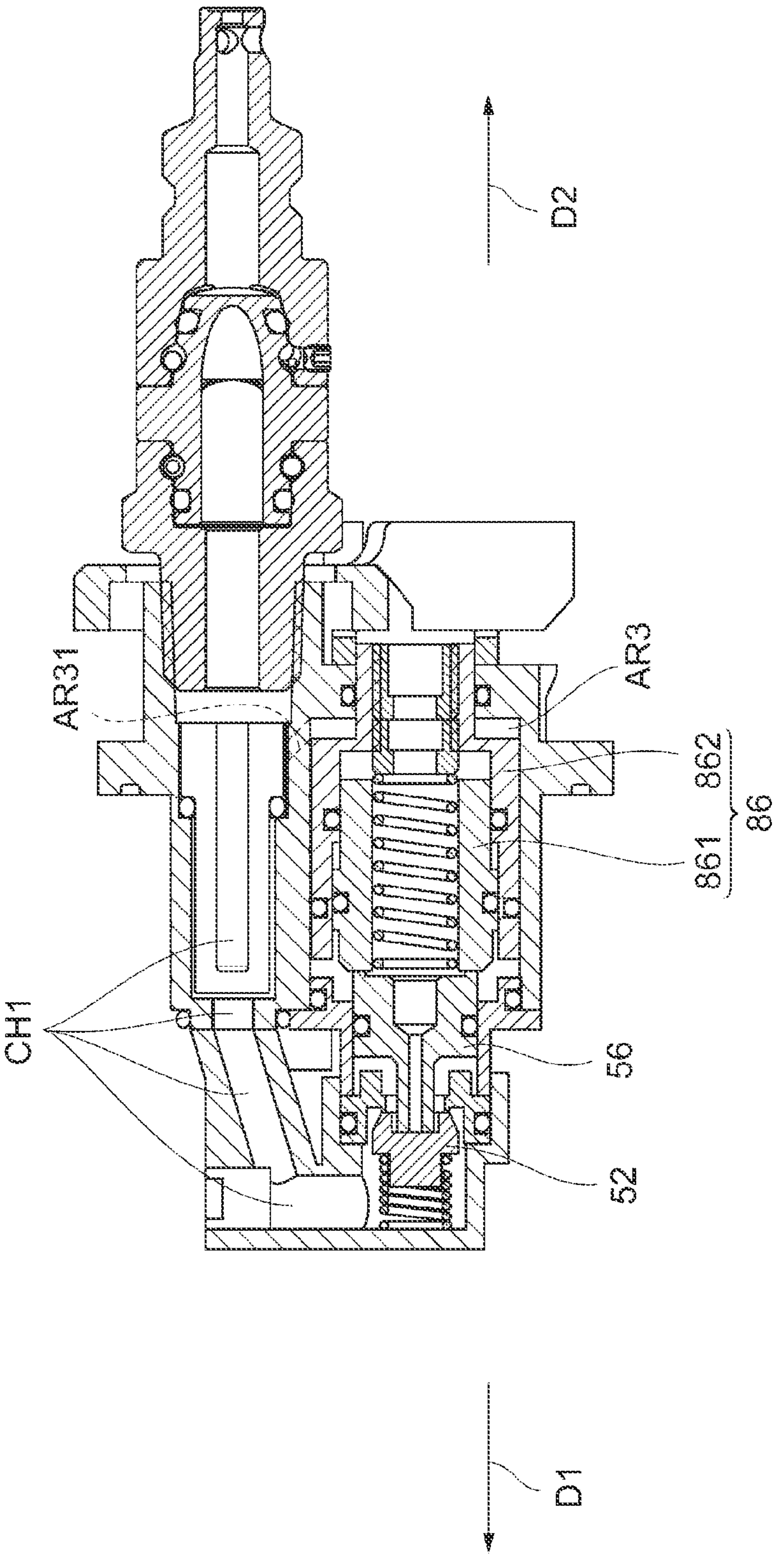
FIG. 9 is a sectional view showing a modification of a load reducing mechanism shown in FIG. 8.

FIG. 9 is a sectional view showing a modification of the load reducing mechanism shown in FIG. 8. This modification is different from the present embodiment in that the load release piston 86 further includes an inner cylindrical portion 861 fitted inside an outer cylindrical portion 862, in addition to the outer cylindrical portion 862 configured as the support part. The inner cylindrical portion 861 is formed in a cylindrical shape through which the main spring 54 is inserted. The shape of the inner cylindrical portion 861 may be a cylindrical shape or a square tubular shape.

The outer cylindrical portion 862 is configured to be slidable along the inner cylindrical portion 861 surrounding the main spring 54. The end of the main spring 54 on the side facing the second direction D2 is supported by the outer cylindrical portion 862. The end of the main spring 54 on the side facing the first direction D1 penetrates the inner cylindrical portion 861 and faces the piston 56. Even with the configuration of the modification shown in FIG. 9, the operating load of the pressure adjusting mechanism can be reduced as in the configuration shown in FIG. 8.

[Primary Pressure Balance Mechanism]

Hereinafter, a primary pressure balance mechanism included in the regulator 50 will be described with reference to FIGS. 10 to 12. It is known that when a primary pressure becomes low, the valve body 52 is pushed to the primary side to open the valve, and a secondary pressure becomes high. The primary pressure balance mechanism has a structure in which a primary pressure is applied to the piston 56 to constantly apply a load in the first direction D1 to the piston 56. The primary pressure balance mechanism reduces the influence of the primary pressure on the secondary pressure by cancelling at least a part of the fluctuation in the primary pressure.

Figure 10:
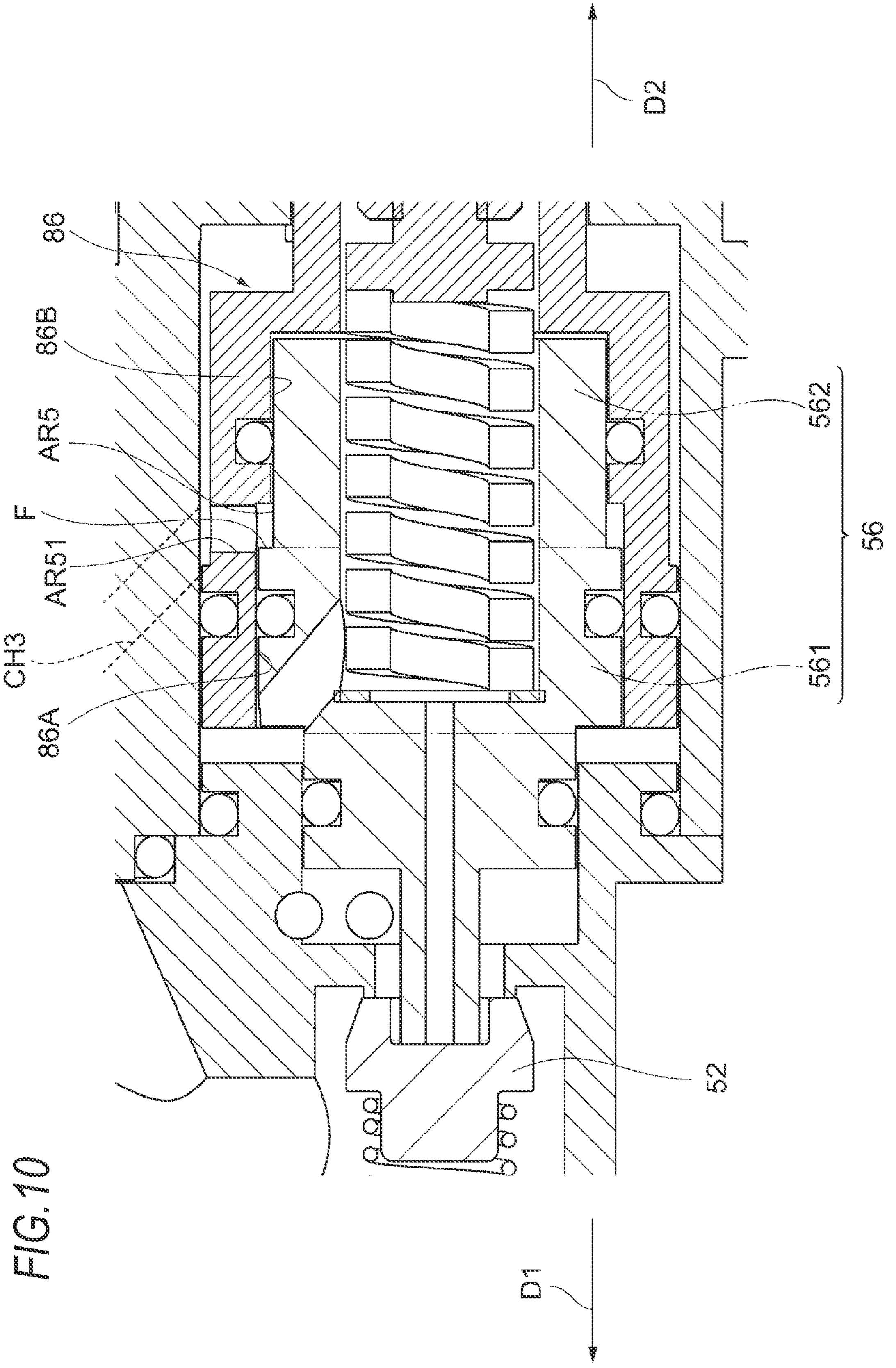
FIG. 10 is a partially enlarged view of the FIG. 3A when the valve is closed.

FIG. 10 is a partially enlarged view of the FIG. 3A when the valve is closed. As shown in FIG. 10, the primary pressure balance mechanism includes flow paths CH3 and AR51 that introduce the compressed fluid on the primary side (upstream side from the valve body 52) into the secondary side (downstream side from the valve body 52), and a third pressure receiving surface F that receives pressure from the compressed fluid introduced from the primary side.

In the illustrated example, the piston 56 has a columnar enlarged diameter portion 561 and a columnar reduced diameter portion 562 having a diameter smaller than that of the enlarged diameter portion 561. In the piston 56, the enlarged diameter portion 561 is provided on the side facing the first direction D1, and the reduced diameter portion 562 is provided on the side facing the second direction D2. The third pressure receiving surface F having an annular shape is formed at the boundary between the enlarged diameter portion 561 and the reduced diameter portion 562. The shape of the third pressure receiving surface F is not limited to the illustrated example. For example, when the columnar portions 561, 562 have the same diameter, an outer peripheral surface of the columnar portion 562 on the side facing the second direction D2 may be cut out to form the third pressure receiving surface F having a notch shape.

The load release piston 86 has a substantially cylindrical portion. The load release piston 86 has a first inner peripheral surface 86A that is in sliding contact with at least a part of an outer peripheral surface of the enlarged diameter portion 561, and a second inner peripheral surface 86B that is in sliding contact with at least a part of an outer peripheral surface of the reduced diameter portion 562. As shown in FIG. 7, a space AR5 is defined by the first inner peripheral surface 86A, the outer peripheral surface of the reduced diameter portion 562, and the third pressure receiving surface F of the enlarged diameter portion 561. In the following description, the space may be referred to as a primary pressure balance region AR5. The flow path CH3 penetrating the first inner peripheral surface 86A is formed in the load release piston 86. The flow path CH3 is connected to a bypass flow path (not shown) branched from the flow path CH1 on the primary side. The bypass flow path is formed to straddle the second axis AX2 and the first axis AX1. The compressed air on the primary side is introduced into the primary pressure balance region AR5 through the flow path CH3. The third pressure receiving surface F receives air pressure on the upstream side of the valve body 52 and is pressed in a direction of opening the flow paths CH1, CH2.

The valve body 52 and the third pressure receiving surface F receive a common primary pressure and are pressed in opposite directions. At the valve body 52 and the third pressure receiving surface F pressed in opposite directions, at least a part of a force corresponding to fluctuation in the primary pressure is cancelled out. Meanwhile, the area of the third pressure receiving surface F as viewed from the first direction D1 is smaller than that of a bottom surface of the cylindrical portion 52B of the valve body 52 as viewed from the second direction D2. Since the valve body 52 receives a larger force from the primary pressure than the third pressure receiving surface F, the valve body 52 can push back the piston 56 until it is balanced with the main spring 54 and the secondary pressure. In the illustrated example, the third pressure receiving surface F is formed to be smaller than the above-described second pressure receiving surface (the surface of the piston 56 facing the first direction D1).

First Modification

Figure 11:
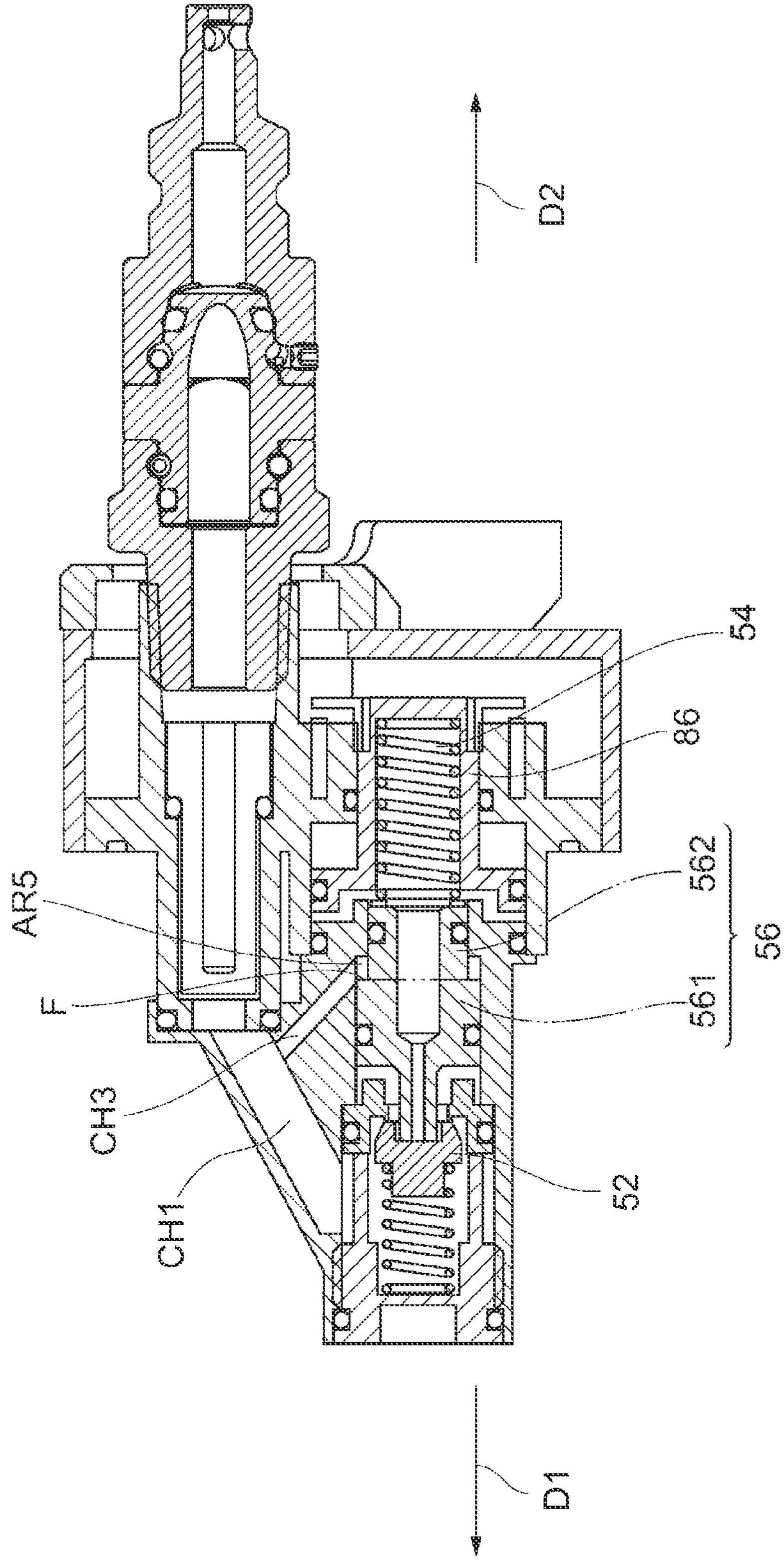
FIG. 11 is a sectional view showing a first modification of a primary pressure balance mechanism shown in FIG. 10.

FIG. 11 is a sectional view showing a first modification of the primary pressure balance mechanism shown in FIG. 10. The first modification is different from the present embodiment in that the piston 56 slides along a housing constituting the regulator 50 instead of the load release piston 86, and a bypass flow path CH3 branched from the flow path CH1 on the primary side and communicating with the primary pressure balance region AR5 is formed in the housing. As shown in FIG. 8, the bypass flow path CH3 is formed to straddle the second axis AX2 and the first axis AX1.

In the illustrated example, the load release piston 86 is arranged on the side facing the second direction D2 with respect to the piston 56. The main spring 54 is fitted inside the load release piston 86 formed in a cylindrical shape. The main spring 54 urges the end of the piston 56 on the side facing the second direction D2 toward the first direction D1. Even in the primary pressure balance mechanism of this modification, similarly to the primary pressure balance mechanism of the present embodiment, the primary pressure is applied to the piston 56 to constantly apply a load in the first direction D1 to the piston 56, and thus, the influence of the primary pressure on the secondary pressure can be reduced.

Second Modification

Figure 12:
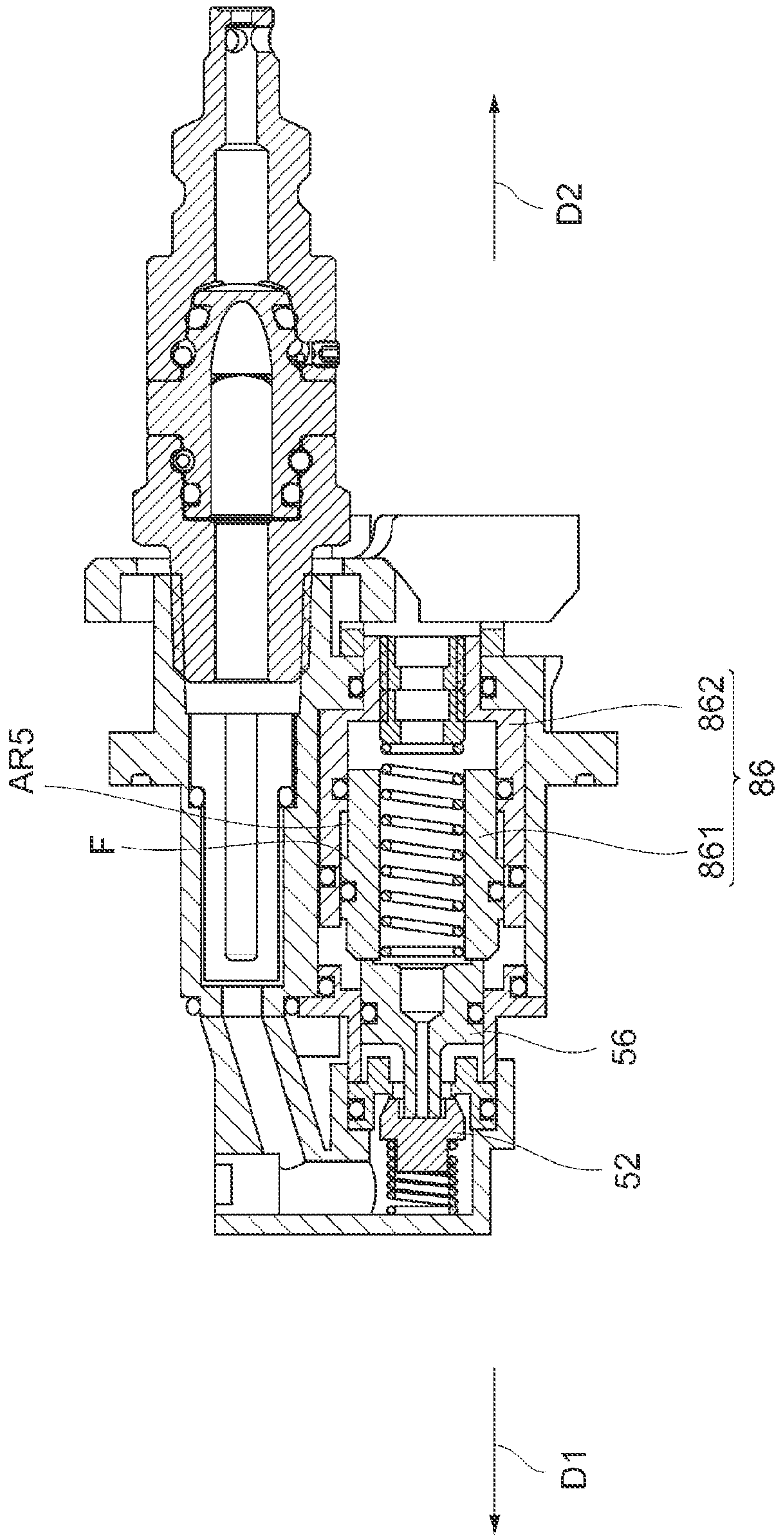
FIG. 12 is a sectional view showing a second modification of the primary pressure balance mechanism shown in FIG. 10.

FIG. 12 is a sectional view showing a second modification of the primary pressure balance mechanism shown in FIG. 10. The second modification is different from the present embodiment in that the pressure receiving surface F that receives a primary pressure common to the valve body 52 and is pressed in the direction opposite to the valve body 52 is formed not on the piston 56 but on the inner cylindrical portion 861 of the load release piston 86 divided into the inner cylindrical portion 861 and the outer cylindrical portion 862.

The inner cylindrical portion 861 is configured to be able to come into contact with the piston 56 which is a pressure receiving member. The primary pressure balance region AR5 is defined in a gap between the inner cylindrical portion 861 and the outer cylindrical portion 862, which have a spigot structure. The compressed fluid on the primary side is introduced into the primary pressure balance region AR5 through a bypass flow path (not shown). Even in the primary pressure balance mechanism of this modification, similarly to the primary pressure balance mechanism of the present embodiment, the primary pressure is applied to the piston 56 to constantly apply a load in the first direction D1 to the piston 56, and thus, the influence of the primary pressure on the secondary pressure can be reduced.

With the configuration as described above, the secondary pressure of the compressed air supplied to the drive mechanism 20 can be changed to adjust the pressure. Further, it is also possible to reduce the operating load at the time of adjusting the pressure. Meanwhile, when the dial 80 is further rotated so that the next convex portion and the next concave portion face each other, the load release piston 86 may be further displaced in the first direction D1 by the slope provided on the spacer 72. With this configuration, the secondary pressure can be adjusted in multiple stages. As described above, according to the present disclosure, it is possible to provide the pneumatic tool capable of reducing the operating load of the pressure adjusting mechanism.

Further, according to the present embodiment, the variation in load characteristic of the main spring 54 can be easily adjusted. Since each spring has a characteristic that a variation in load characteristic is large, after assembling a regulator, the variation in load characteristic of the regulator is eliminated by inserting a washer or by adjusting a screw for adjusting the initial load. In the present embodiment, the main spring 54, which is an elastic body, is arranged outside the valve body 52, that is, at a position close to the air intake. Therefore, the position of the end of the main spring 54 in the second direction D2 can be easily adjusted by removing the dial 80 and changing the position of the adjustment screw 66. As a result, the variation in load characteristic of the main spring 54 can be easily adjusted.

Further, in the present embodiment, in the first direction D1, the region where the main spring 54 is provided (region from the end of the main spring 54 in the first direction D1 to the end of the main spring 54 in the second direction D2) and the region where the first flow path CH1 is provided are at least partially overlapped. In this way, the full length W (see FIG. 3A) of the regulator 50 in the first direction D1 can be made smaller than that of the regulator in the related art, so that the amount of protrusion of the plug 62 can be suppressed and the full length of the nailing tool 10 can be shortened. Moreover, in the present embodiment, since there is a margin in the region on the second axis AX2, the large air filter 60 can be provided on the second axis AX2 (to be coaxial with the second axis AX2), as shown in FIG. 3A. It is possible to reduce the possibility that the regulator 50 cannot operate normally.

Meanwhile, the present disclosure can be applied to general pneumatic tools, for example, to air nailers, air drivers and pneumatic screwdrivers. The present disclosure may be applied to compressed fluid other than compressed air. Further, the present disclosure can be modified in various ways as long as it does not deviate from the gist thereof. For example, within the normal creative abilities of those skilled in the art, some components in the embodiments can be replaced with other known components that exhibit similar functions.

In the above aspect, the valve body and the elastic body may be arranged on a first axis, and at least a part of a flow path from the air intake to the pressure adjusting mechanism may extend along a second axis substantially parallel to the first axis.

In the above aspect, a flow path from the air intake to the pressure adjusting mechanism may have a portion extending in a first direction, and at least a part thereof may overlap, in the first direction, with a region where the elastic body is provided.

In the above aspect, the pressure receiving member may be a piston component that is arranged between the valve body and the elastic body and presses the valve body by the elastic body.

In the above aspect, the pneumatic tool may further include an adjustment unit configured to adjust an urging force exerted by the elastic body.

In the above aspect, the pneumatic tool may be applied to a driving tool for striking out a fastener. Further, the elastic body may be configured to exert an urging force in a first direction to the valve body, the pressure receiving member may be configured to exert an urging force in a second direction opposite to the first direction to the valve body, and a flow path from the air intake to the pressure adjusting mechanism may have a flow path for advancing compressed air in the first direction. Meanwhile, the present disclosure may be applied to compressed fluid other than compressed air.

Further, the present disclosure provides a pneumatic tool that includes a drive mechanism driven by compressed fluid and a valve mechanism for supplying the compressed fluid to the drive mechanism. In a direction of advancing in a first direction from the outside to the inside of the pneumatic tool, a plug, an elastic body, a piston component pressed by the elastic body, and a valve body pressed by the piston component are arranged in this order. Further, a flow path is formed that communicates a valve chamber in which the valve body is arranged and a flow path in the plug.

In addition, the present disclosure provides a pneumatic tool including a drive mechanism configured to be driven by compressed air supplied from an air intake. The pneumatic tool includes an air chamber configured to store the compressed air supplied, and a pressure adjusting mechanism configured to adjust the pressure of the compressed air in the air chamber. The pressure adjusting mechanism includes a valve body configured to open and close a flow path that communicates the air intake and the air chamber with each other, an elastic body configured to exert an urging force to the valve body in a direction of opening the flow path, a support part configured to support an end of the elastic body, a pressure receiving member configured to receive air pressure in the air chamber and press the elastic body in a direction of closing the flow path, and a load reducing mechanism capable of switching the urging force of the elastic body acting on the valve body between a normal state and a load reduction state in which the urging force smaller than the normal state is exerted.

In the above aspect, the support part may move when the normal state is switched to the load reducing state.

In the above aspect, the pneumatic tool may further include an operation input part by which a user can operate the urging force of the elastic body, and the normal state may be switched to the load reducing state in conjunction with the operation input to the operation input part.

In the above aspect, the pneumatic tool may further include an inner cylindrical portion formed in a cylindrical shape, the support part may be an outer cylindrical portion that is externally fitted to the inner cylindrical portion and is slidable along the inner cylindrical portion, and the elastic body may penetrate the inner cylindrical portion and face a piston component.

In the above aspect, the valve body and the elastic body may be arranged on a first axis, at least a part of a flow path from the air intake to the pressure adjusting mechanism may extend along a second axis substantially parallel to the first axis, and the elastic body may be arranged at a position closer to the air intake than the valve body.

In the above aspect, the pneumatic tool may include a load release region that is a closed space facing the support part and defined on the side opposite to the valve body with the support part interposed therebetween, a pressurized flow path that can introduce compressed air on the upstream side of the valve body into the load release region, a depressurized flow path that can discharge the compressed air introduced into the load release region to the outside of the pressure adjusting mechanism, and a load release valve configured to open and close the depressurized flow path.

In the above aspect, the load release valve may be opened in response to the operation of the operation input part, and the support part may move to the side opposite to the side where the valve body is located when the load release region is depressurized.

Further, the present disclosure is a pressure regulator for adjusting the pressure of compressed air. The pressure regulator includes a valve body configured to open and close a flow path that communicates an air intake for supplying compressed air and an air outlet for taking out the pressure-adjusted compressed air, an elastic body configured to exert an urging force to the valve body in a direction of opening the flow path, and a pressure receiving member configured to receive air pressure on the downstream side of the valve body and press the elastic body in a direction in which the valve body closes the flow path. The pressure regulator includes a pressure adjusting mechanism configured to adjust the pressure of compressed air acting on the valve body. The pressure adjusting mechanism includes a valve body configured to open and close a flow path that communicates the air intake and the air chamber with each other, an elastic body configured to exert an urging force to the valve body in a direction of opening the flow path, and a pressure receiving member configured to receive air pressure in the air chamber and press the elastic body in a direction of closing the flow path. The pressure receiving member is provided with a second pressure receiving surface that receives air pressure in the air chamber and is pressed in a direction of closing the flow path. The pressure receiving member or the member in contact with the pressure receiving member is provided with a third pressure receiving surface that is formed smaller than the second pressure receiving surface, receives air pressure on the upstream side of the valve body and is pressed in a direction of opening the flow path.

In the above aspect, the valve body and the elastic body may be arranged on a first axis, and at least a part of a flow path from the air intake to the pressure adjusting mechanism may extend along a second axis substantially parallel to the first axis.

In the above aspect, a bypass flow path for applying air pressure on the upstream side of the valve body to the third pressure receiving surface may be formed to straddle the second axis and the first axis.

In the above aspect, the pressure receiving member may be a piston component that is arranged between the valve body and the elastic body and presses the valve body by the elastic body.

In the above aspect, the pneumatic tool may further include an inner cylindrical portion that can come into contact with the pressure receiving member and an outer cylindrical portion that is slidable along the inner cylindrical portion, and the third pressure receiving surface may be provided between the outer cylindrical portion and the inner cylindrical portion.

Second Embodiment

Hereinafter, a pneumatic tool according to a second embodiment will be described. Here, for components that can be understood by those skilled in the art to have the same or similar configurations or functions as the components described in the first embodiment and its modifications, the same or similar names are given and detailed description will be omitted. The points different from the pneumatic tool according to the first embodiment will be mainly described. FIGS. 13A to 14B, respectively, show a sectional view of a regulator 150 (an example of the "pressure adjusting mechanism") mounted on a nailing tool 110 (an example of the "pneumatic tool", FIG. 15) according to the second embodiment at the low pressure setting time and at the high pressure setting time. FIG. 15 is a view of the nailing tool 110 as viewed from the first direction D1.

Since each configuration of the nailing tool 110 other than the regulator 150 is the same as that of the nailing tool 10, the description thereof will be omitted.

[Basic Configuration of Pressure Adjusting Mechanism]

Similar to the regulator 50, the regulator 150 regulates the pressure of compressed air supplied from the air intake and stored by the air chamber.

The regulator 150 is common to the regulator 50 in that it includes a plug 162 (an example of the "air intake") for receiving compressed air supplied from the outside, a first end cap 158 arranged to surround at least the outer circumference of the regulator 150 for the purpose of connecting the plug 162, an air filter 160 provided in the first end cap 158, a valve body 152 that is pressed in the second direction D2 by compressed air that has entered a valve chamber 164 from the first end cap 158 through the first flow path CH1, a valve spring 168 (an example of the "coil spring") that presses the valve body 152 in the second direction D2, and a main spring 154 (an example of the "elastic body") that is arranged on the side facing the second direction D2 with respect to the valve body 152 and exerts a force on the valve body 152 toward the first direction D1, and in that it further includes a piston 156 (an example of the "piston component" or "pressure receiving member") arranged between the valve body 152 and the main spring 154.

Further, the regulator 150 is also common to the regulator 50 in that the first flow path CH1 for supplying the compressed air supplied from the plug 162 into the valve chamber 164 is formed in the first end cap 158 to which the plug 162 is attached and in the parts from the first end cap 158 to the valve chamber 164 in which the valve body 152 is disposed, and in that since the valve chamber 164 is arranged at a position advanced in the first direction D1 from an end of the first end cap 158 in the second direction D2 and on the first axis AX1 that is vertically spaced from the second axis AX2, the first flow path CH1 has a portion for advancing the compressed air in the first direction D1 and a portion for advancing the compressed air from the second axis AX2 to the first axis AX1 (including the case having a flow path inclined so that the compressed air advances in the second direction D2 while advancing in the first direction D1).

Furthermore, the regulator 150 is also common to the regulator 50 in that the valve body 152 is a component for adjusting, together with the piston 156, the secondary pressure on the downstream side of the valve body 152, and in that, when the secondary pressure on the downstream side drops, the valve body 152 moves in the first direction D1 to cause the flow path communicating the air intake and the air chamber to be opened and the compressed fluid on the upstream side of the valve body 152 having the primary pressure to flow into the downstream side, thereby raising the secondary pressure, and when the secondary pressure on the downstream side rises, the valve body 152 moves in the second direction D2 to cause the flow path to be closed, thereby lowering the secondary pressure. More specifically, the regulator 150 is also common to the regulator 50 in that the valve body 152 is arranged on the first axis AX1 in the valve chamber 164 (to be coaxial with the first axis AX1), in that the surface of the valve body 152 facing the first direction D1 (an example of the "first pressure receiving surface exposed to the primary pressure region") is exposed to the compressed fluid having the primary pressure, and thus, the valve body 152 can be pressed in the second direction D2, and in that the valve body 152 can be pressed in the second direction D2 by an urging force according to a compression amount of the valve spring 168, which is a compression spring arranged on the side facing the first direction D1 with respect to the valve body 152 and engaged with the valve body 152. On the other hand, the regulator 150 is also common to the regulator 50 in that an apex surface of the valve body 152 facing the second direction D2 is exposed to the compressed fluid having the secondary pressure, so that the valve body 152 can be pressed in the first direction D1, and in that the valve body 152 can be pressed in the first direction D1 (the direction of opening the flow path) via the piston 156 by an urging force according to a compression amount of the main spring 154 arranged on the side facing the first direction D1 with respect to the valve body 152.

In addition, the regulator 150 is also common to the regulator 50 in that since the valve seat is arranged in the second direction D2 with respect to the valve body 152, the movement of the valve body 152 in the second direction D2 is restricted by the valve seat, in that since the surface of the piston 156 facing the first direction D1 (an example of the "second pressure receiving surface exposed to the secondary pressure region") is exposed to the secondary pressure region AR2, the piston 156 is pressed in the second direction D2 (the direction of closing the flow path) by the compressed fluid having the secondary pressure, and in that the valve body 152, the piston 156 and the main spring 154 are arranged in this order in the first direction D1 to be coaxial with the first axis AX1. The pressure of the compressed fluid in the air chamber can be adjusted by adjusting the secondary pressure using such a regulator 150 and supplying the pressure-adjusted compressed fluid into the air chamber via the second flow path CH2. Since the mechanism of adjusting the secondary pressure by the regulator 150 is the same as that of the first embodiment, the description thereof will be omitted.

[Detailed Configuration of Regulator]

The regulator 50 according to the first embodiment is configured such that a user can set the secondary pressure by operating the dial 80. The regulator 150 according to the present embodiment is different from the regulator 50 according to the first embodiment in that a user can set the secondary pressure by rotating an operating lever 180. Specifically, the regulator 150 is configured such that, according to the rotation angle of the operating lever 180 set by the rotation of the operating lever 180 by a user, for example, the secondary pressure can be set in four stages of 1.4 MPa, 1.6 MPa, 1.8 MPa and 2.3 MPa when the primary pressure is 2.3 MPa or more. The regulator 150 according to the present embodiment is configured such that the secondary pressure can be set in four stages by changing the length of the main spring 154 in four stages by using a cam 182. Hereinafter, the detailed configuration of the regulator 150 will be described. Meanwhile, the magnitude of the secondary pressure, which can be changed in a stepwise manner, may be different depending on the magnitude of the primary pressure.

Figure 13A:
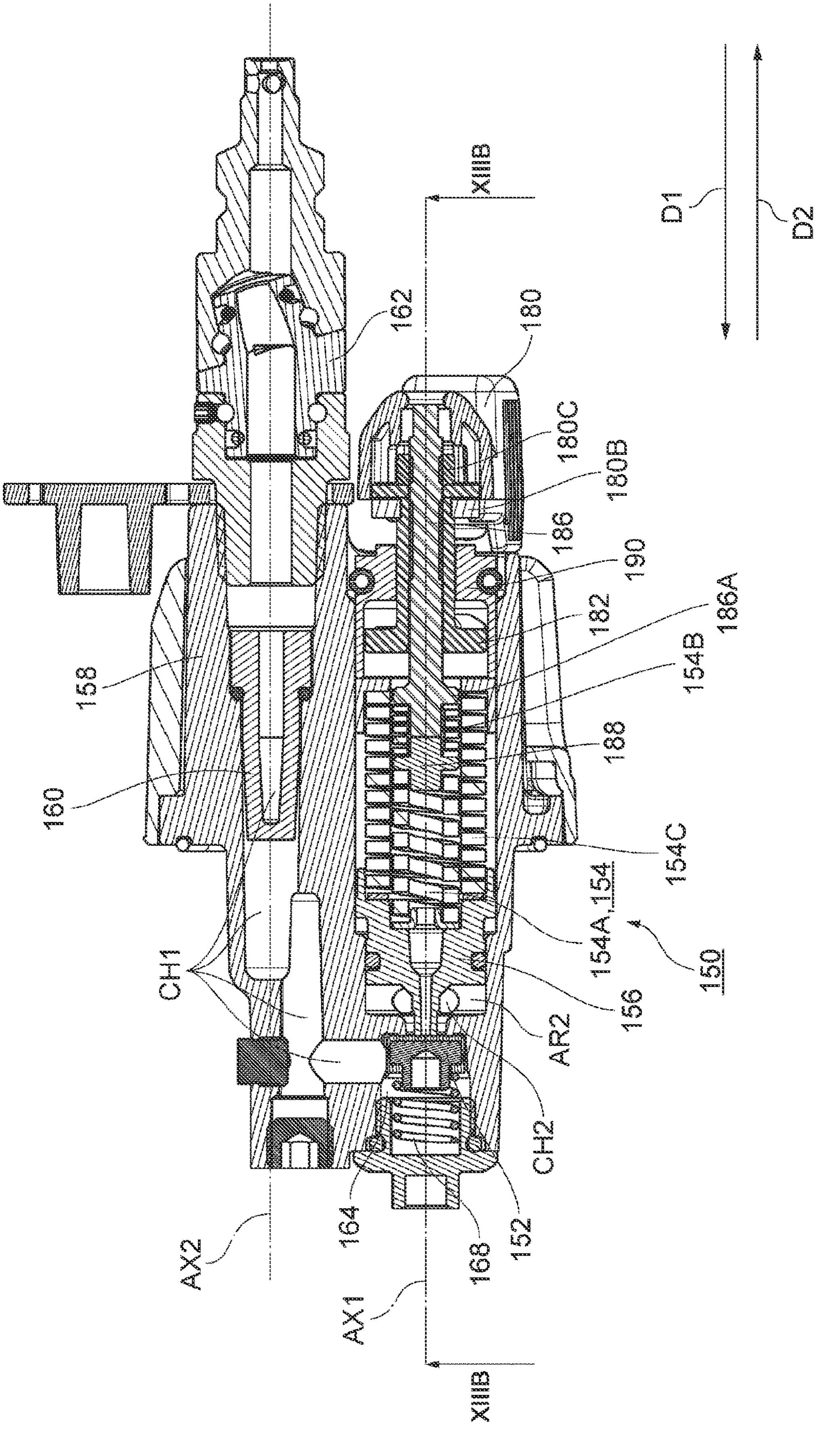
FIG. 13A is a sectional view of a nailing tool according to an embodiment.
Figure 13B:
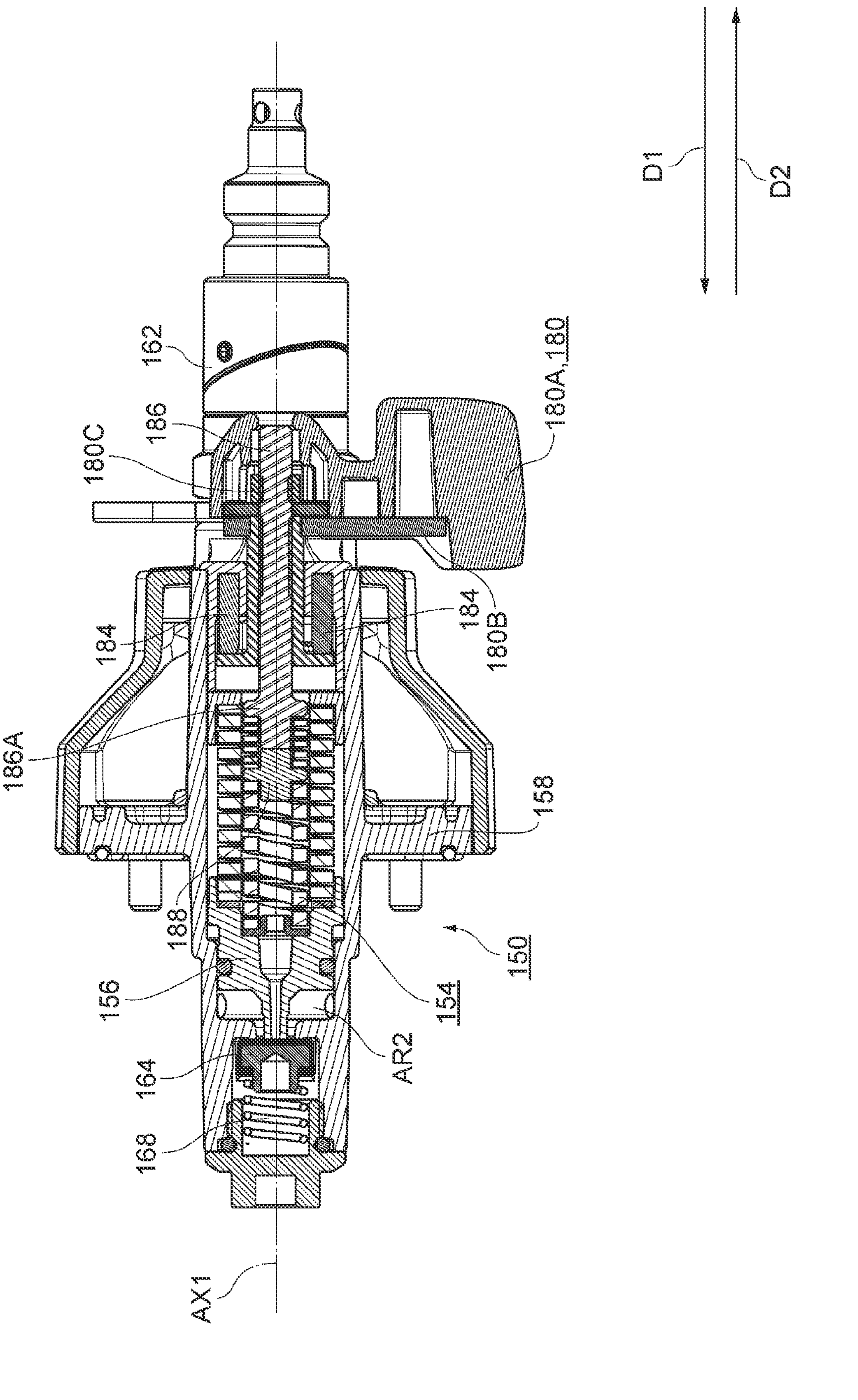
FIG. 13B is a sectional view of a nailing tool according to the embodiment.

As shown in FIG. 13B and the like, the regulator 150 includes the operating lever 180 configured to be rotatable by an operation of a user, the cam 182 configured to be rotatable by the operating lever 180, a pin 184 for moving the cam 182 in a rotational axis direction by coming into sliding contact with the surface of the cam 182, a spring adjuster 186 (an example of the "pressure adjusting member" and "second urging force adjusting member". Hereinafter, which may be referred to as the "pressure adjusting member 186" or "pressure adjusting shaft 186".) configured to be movable in the rotational axis direction in conjunction with the cam 182, and a pressure adjusting spacer 188 that supports an end of the main spring 154 in the second direction D2 and is configured to be movable in the rotational axis direction as the spring adjuster 186 moves in the rotational axis direction.

According to such a configuration, when a user rotates the operating lever 180, the cam 182 rotated by the operating lever 180 converts a rotational motion into a translational motion, so that the pressure adjusting spacer 188 supporting the main spring 154 is translated. Therefore, the length of the main spring 154 supported by the pressure adjusting spacer 188 can be set in a stepwise manner, and thus, the secondary pressure can be set.

As shown in FIGS. 13A and 13B and the like, the operating lever 180 is arranged at an end in the second direction D2 on the first axis AX1 so as to have a rotation axis on the first axis AX1. As shown in FIG. 15, the operating lever 180 is provided to have a protrusion 180A that protrudes in an outer diameter direction from the first end cap 158 surrounding the outer circumference of the regulator 150 as viewed from the second direction D2 parallel to the first axis AX1, which is the rotation axis. With such a configuration, the operating lever 180 and the cam 182 connected to the operating lever 180 can be rotated around the first axis AX1 with a small operating load. Moreover, since the setting pressure of the secondary pressure is determined according to the position of the protrusion 180A as described later, a user can also visually grasp the level of the setting pressure based on the position of the protrusion 180A.

The operating lever 180 includes a metallic portion 180B that engages with a cam engagement portion 182C (FIG. 16) formed in a polygonal shape at the tip portion of the metallic cam 182. Since the plate-shaped metallic portion 180B is provided to engage (contact) with the metallic cam engagement portion 182C, the cam 182 can be rotated in conjunction with the rotation of the operating lever 180.

Further, the operating lever 180 includes a nut 180C (FIGS. 13A and 13B) that is screwed into a male screw provided on the pressure adjusting member 186. As will be described later, the cam 182 is screwed into the male screw provided on the pressure adjusting member 186. Thus, due to a double-nut structure in which the cam 182 screwed in a base-end side region of the male screw formed on the pressure adjusting member 186 functions as a first nut and the nut 180C screwed in a tip-end side region of the male screw formed on the pressure adjusting member 186 functions as a second nut, the pressure adjusting member 186, the cam 182, and the operating lever 180 can be prevented from loosening from each other.

The cam 182 (an example of the "urging force adjusting member") is a member for converting a rotational motion into a translational motion by being rotated with the rotation of the operating lever 180. The cam 182 is arranged so that its central axis exists on the first axis AX1 in a state of being urged in the second direction D2 at a position where the cam 182 advances in the first direction D1 with respect to the operating lever 180.

Figure 16:
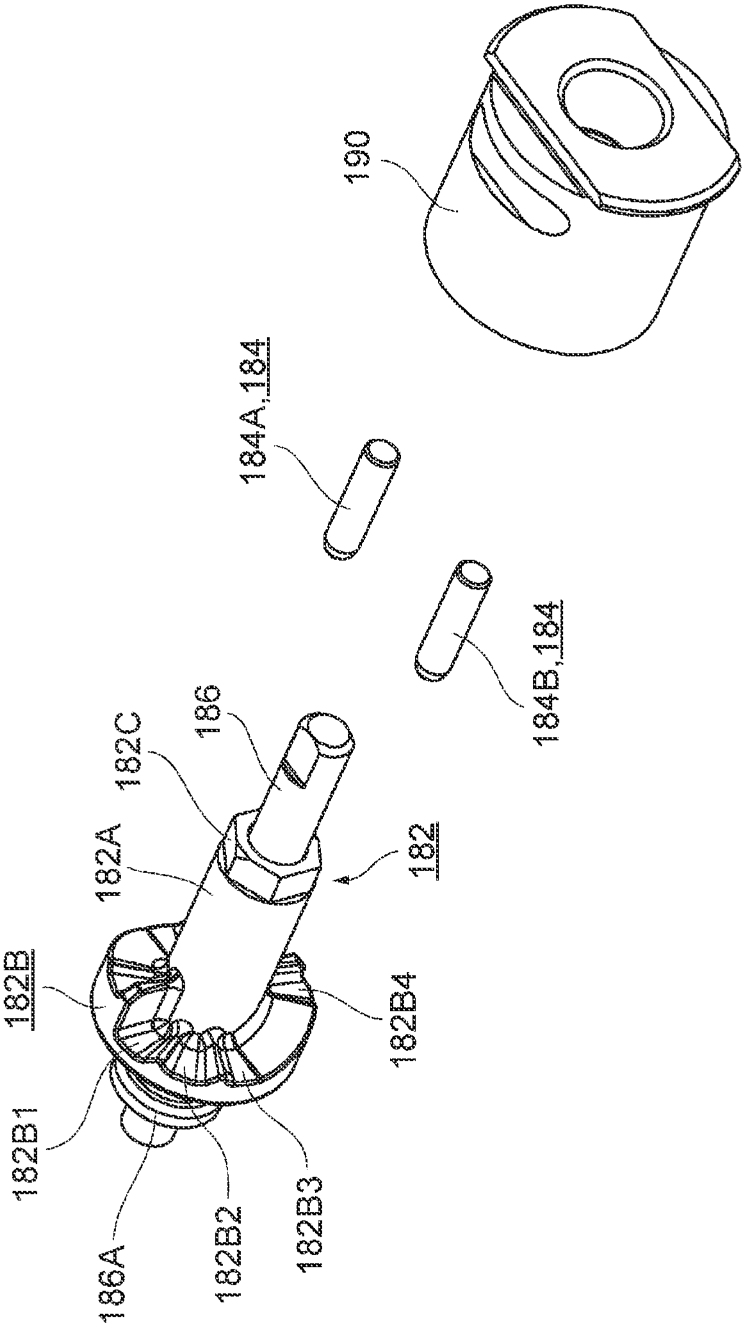
FIG. 16 is a perspective view of a component of a pressure adjusting mechanism includes a cam according to the embodiment.

FIG. 16 shows a perspective view of a component including the cam 182. As shown in FIG. 16, the cam 182 in the present embodiment has an annular cylindrical portion 182A in which a female screw is formed on an inner peripheral surface, a bottom portion 182B extending in the outer diameter direction at an end of the cylindrical portion 182A in the first direction D1, and the cam engagement portion 182C for engaging with the operating lever 180 at an end of the cylindrical portion 182A in the second direction D2. On the surface of the bottom portion 182B facing the axial direction (the second direction D2), four stepped surfaces 182B1 to 182B4 (an example of the "surface of the cam on which the pin slides") provided at different heights in a central axis direction of the cam 182 are provided to be rotationally symmetric by 180 degrees with respect to the central axis.

When the cam 182 is urged in the second direction D2 so that an end (tip) in the first direction D1 of the pin 184 attached to a main body of the regulator 150 abuts on any surface of the stepped surfaces 182B1 to 182B4, the cam 182 can be moved in the first direction D1 or the second direction D2 according to the surface of the stepped surfaces 182B1 to 182B4 on which the pin 184 abuts. In the present embodiment, the step between the stepped surface 182B1, the stepped surface 182B2 and the stepped surface 182B3 has a relatively small step, and the step between the stepped surface 182B3 and the stepped surface 182B4 has a relatively large step.

For example, when the primary pressure is 2.3 MPa and the pin 184 abuts on the stepped surface 182B1, the secondary pressure is adjusted to 1.4 MPa. Similarly, when the pin 184 abuts on the stepped surfaces 182B2 to 182B4, the secondary pressure is adjusted to 1.6 MPa, 1.8 MPa and 2.3 MPa, respectively. With such a configuration, the secondary pressure can be set with fine resolution in a relatively small pressure region. Therefore, when performing a work such as finishing with a relatively small pressure, the pressure for driving a fastener can be finely set.

Meanwhile, a protrusion protruding in the second direction D2 from both adjacent stepped surfaces may be provided at the boundary between the stepped surface 182B1 and the stepped surface 182B2. Similarly, a protrusion protruding in the second direction D2 from both adjacent stepped surfaces may be provided at the boundary between the stepped surface 182B2 and the stepped surface 182B3 and the boundary between the stepped surface 182B3 and the stepped surface 182B4, respectively. When such a protrusion is provided, the pin 184 can be stably brought into contact with the stepped surface.

Meanwhile, the number of steps provided on the cam 182 may be two or more. When the number of steps is two or more, the secondary pressure can be set in two or more stages.

Further, in the present embodiment, two pins 184 of a pin 184A and a pin 184B are prepared and four stepped surfaces 182B1 to 182B4 are provided to be rotationally symmetric by 180 degrees, that is, a total of eight stepped surfaces are provided, but the present disclosure is not limited thereto. For example, the number of pins may be one, and the cam 182 may be provided with two stepped surfaces. Alternatively, the number of pins may be three, and a plurality of stepped surfaces may be provided to be rotationally symmetric by 120 degrees. The pin 184 (an example of the "member configured to be slidable on the surface of the cam") moves the cam 182 in the first direction D1 or the second direction D2 by coming into sliding contact with the stepped surfaces 182B1 to 182B4 of the cam 182. The pin 184 in the present embodiment is inserted into a hole that opens in the first direction D1 of an annular component 190 fixed to the main body of the regulator 150 at the end in the first direction D1 and extends in the second direction D2. In this way, the pin 184 is attached so that the movement in the second direction D2 and the direction perpendicular to the second direction D2 is restricted. In this state, the end of the pin 184 in the first direction D1 abuts on any of the stepped surfaces 182B1 to 182B4 of the cam 182, so that the pin 184 can move the cam 182 in the first direction D1 or the second direction D2. Meanwhile, instead of the pin 184, a member such as a steel ball may be slidably provided on the surface of the cam.

The pin 184 in the present embodiment includes two pins of the pin 184A and the pin 184B, which are arranged to be rotationally symmetric with respect to the first axis AX1. Therefore, when one pin 184A abuts on the stepped surface 182B1, the other pin 184B is provided to be rotationally symmetric by 180 degrees with the stepped surface 182B1 and abuts on the stepped surface having the same height as the stepped surface 182B1. When the two pins of the pin 184A and the pin 184B abut on the stepped surfaces having the same height in this way, the cam 182 can be moved in the first direction D1 or the second direction D2 in a stable posture.

Meanwhile, both the pin 184 and the cam 182 are preferably made of a metal, and the cam 182 is more preferably made of a metal having a hardness higher than that of the metal forming the pin 184. By providing the hardness difference in this way, the pin 184 can be mainly used as a part that is worn by siding contact. Therefore, the maintenance of the regulator 150 can be performed by replacing only the pin 184 of the cam 182 and the pin 184.

The pressure adjusting member 186, which is a spring adjuster, is a component for changing the length of the main spring 154 by moving in the first direction D1 or the second direction D2 together with the cam 182. The pressure adjusting member 186 according to the present embodiment is formed in a cylindrical shape extending in the second direction D2 so that its central axis exists on the first axis AX1 in a state of being urged in the second direction D2 by the main spring 154. An enlarged diameter portion 186A extending in the outer diameter direction is provided at an end of the pressure adjusting member 186 in the first direction D1, and an end of the main spring 154B engages with a bottom surface of the enlarged diameter portion 186A facing the first direction D1. In this way, the pressure adjusting member 186 and the cam 182 fixed by being screwed with the pressure adjusting member 186 are urged in the second direction D2. A male screw that is screwed with a female screw formed on an inner peripheral surface of the cylindrical portion 182A of the cam 182 is formed at an intermediate portion of the pressure adjusting member 186. A second male screw that is screwed with the nut 180C provided inside the operating lever 180 is formed at an end of the pressure adjusting member 186 in the second direction D2. Meanwhile, the first male screw and the second male screw do not necessarily have to be formed separately, and may be formed continuously or integrally, for example.

Further, the regulator 150 according to the present embodiment can finely adjust the length of the main spring 154 by changing the relative positional relationship between the pressure adjusting member 186 and the cam 182. In a state where the pressure adjusting member 186 is urged in the second direction D2, the screwing of the male screw of the pressure adjusting member 186 and the female screw of the cam 182 does not easily loosen due to the urging. Further, the double-nut structure by the screwing of the nut 180C with the female screw makes it possible to realize a structure that is more difficult to loosen. However, since the pressure adjusting member 186 and the cam 182 are screwed together, the relative position of the pressure adjusting member 186 with respect to the cam 182 can be changed by rotating the pressure adjusting member 186 relative to the cam 182. Further, when the pressure adjusting member 186 is not urged, such as when the regulator 150 is manufactured, it is possible to easily change the relative position of the pressure adjusting member 186 with respect to the cam 182 by rotating the pressure adjusting member 186 relative to the cam 182. With such a configuration, it is also possible to easily adjust the variation in the load characteristics based on the individual difference of the main spring 154 or the change with time.

The main spring 154 presses the valve body 152 in the first direction D1 via the piston 156. The main spring 154 is common to the main spring 54 of the regulator 50 according to the first embodiment in that the main spring 154 is arranged on the first axis AX1 and moves the valve body 152 in the first direction D1 when the secondary pressure drops. The regulator 150 according to the present embodiment is different from the regulator 50 according to the first embodiment where the main spring 54 is configured by a single main spring 54 in that the main spring 154 is configured by main springs 154A to 154C which are three elastic bodies. Each of the main springs 154A to 154C is a component for pressing the valve body 152 in the first direction D1 via the piston 156 and is arranged to have a central axis on the first axis AX1.

Figure 14A:
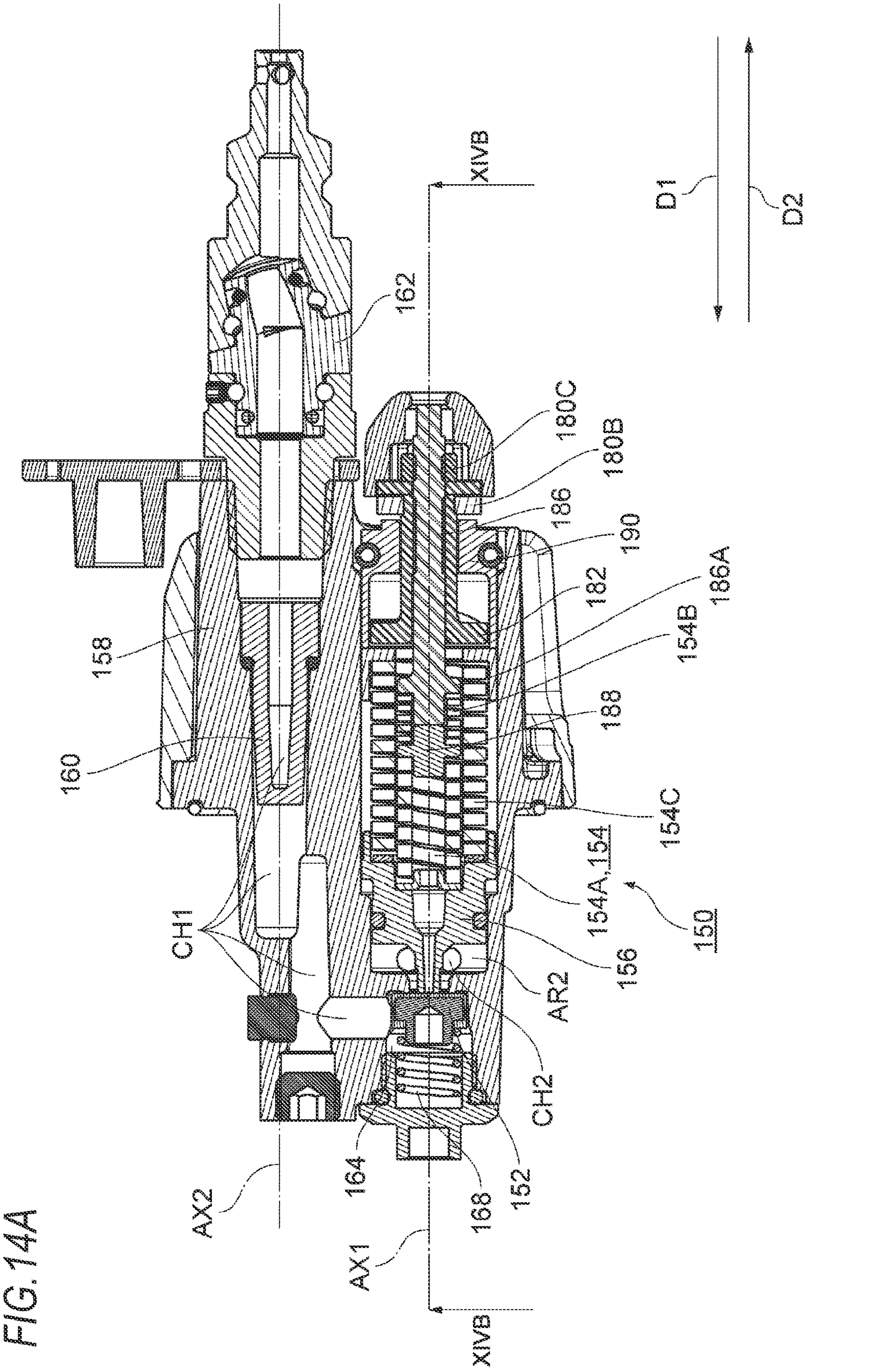
FIG. 14A is a sectional view of a nailing tool according to the embodiment.
Figure 15:
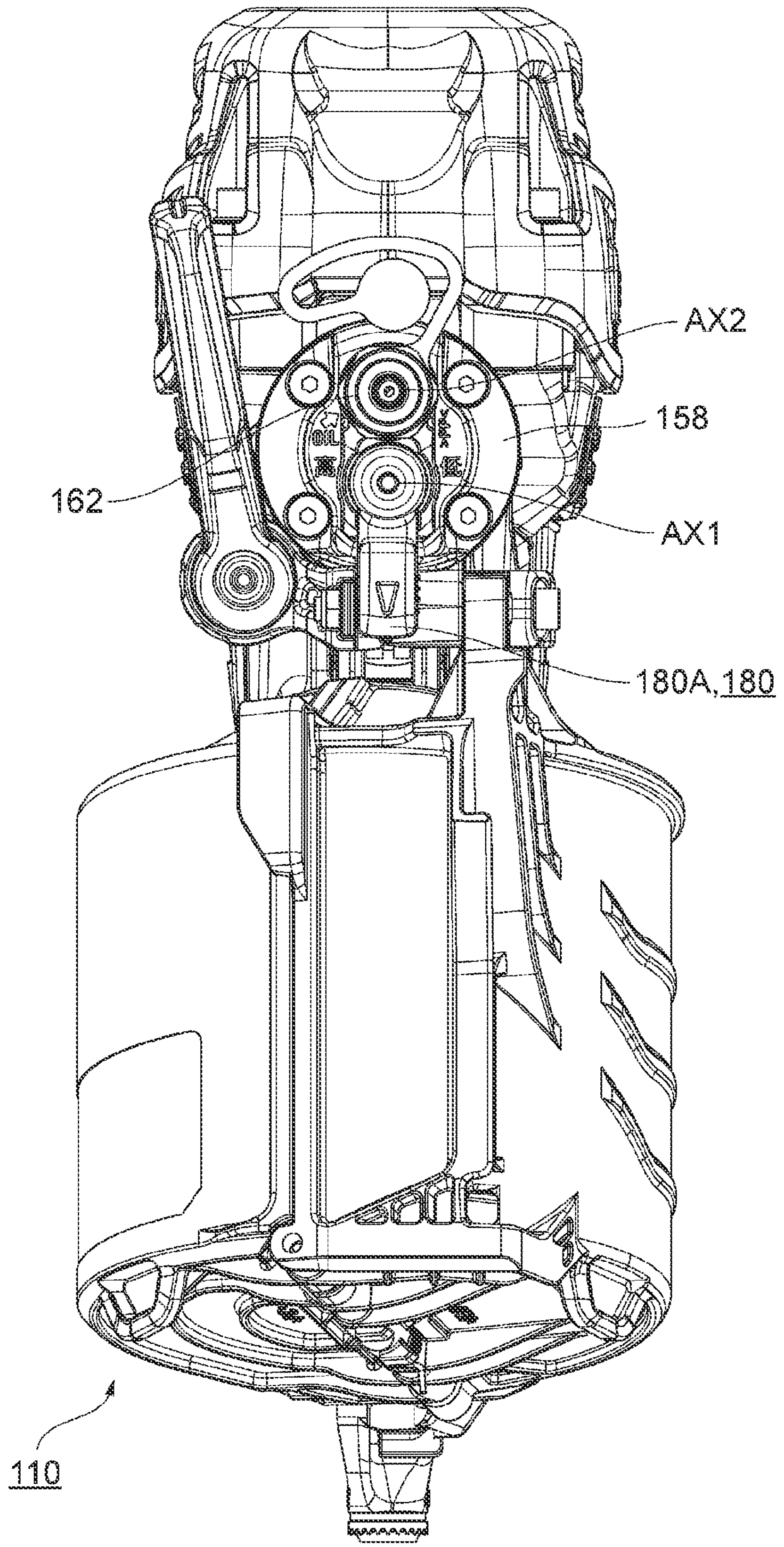
FIG. 15 is a view of a nailing tool 110 as viewed from a first direction.

As shown in FIG. 14A and the like, the main spring 154A is an elastic body that is arranged at a position advanced in the second direction D2 with respect to an end (tip) of the piston 156 in the first direction D1 and on the other hand, at a position advanced in the first direction D1 with respect to the pressure adjusting spacer 188. Further, an end of the main spring 154A in the first direction D1 engages with the piston 156, and an end of the main spring 154A in the second direction D2 is supported by the pressure adjusting spacer 188. Therefore, when the cam 182 moves in the first direction D1, and accordingly, the pressure adjusting member 186 moves in the first direction D1, the pressure adjusting spacer 188 moves in the first direction D1 to compress the main spring 154A, and thus, the length of the main spring 154A can be shortened. On the other hand, when the cam 182 moves in the second direction D2, and accordingly, the pressure adjusting member 186 moves in the second direction D2, the pressure adjusting spacer 188 moves in the second direction D2 to extend or restore the main spring 154A (to reduce the amount of compression of the main spring 154A), and thus, the length of the main spring 154A can be lengthen.

Meanwhile, the main spring 154 may additionally include the main spring 154B and the main spring 154C. As shown in FIG. 14A and the like, the main spring 154B is an elastic body that is arranged at a position advanced in the second direction D2 with respect to the main spring 154A and the pressure adjusting spacer 188 and on the other hand, at a position advanced in the first direction D1 with respect to the enlarged diameter portion of the pressure adjusting member 186. Further, an end of the main spring 154B in the first direction D1 engages with the enlarged diameter portion of the pressure adjusting spacer 188, and an end of the main spring 154B in the second direction D2 is supported by the enlarged diameter portion 186A of the pressure adjusting member 186. In other words, the main spring 154A and the main spring 154B are connected in series with the pressure adjusting spacer 188 interposed therebetween. Therefore, a force toward the first direction D1 corresponding to the combined force of an elastic force of the main spring 154A and an elastic force of the main spring 154B can act on the piston 156 from the main spring 154A and the main spring 154B.

As shown in FIG. 14A and the like, the main spring 154C is an elastic body that is arranged at a position advanced in the second direction D2 with respect to an end (tip) of the piston 156 in the first direction D1 so as to surround the main spring 154A and the main spring 154B having substantially the same outer diameter.

In the regulator 150 according to the present embodiment, a spring load (elastic force) of the main spring 154A and a spring load (elastic force) of the main spring 154C act on the piston 156, while only the spring load (elastic force) of the main spring 154A of both main springs acts on the pressure adjusting member 186. With such a configuration, the operating load of the operating lever 180 can be reduced.

For example, when the primary pressure is the lowest setting value (for example, 1.4 MPa), only the (constant) spring load by the main spring 154C of both main springs may act on the piston 156 by extending the main spring 154A to its natural length. When the primary pressure is the second lowest setting value (for example, 1.6 MPa), the (relatively small) spring load by the main spring 154A and the (constant) spring load by the main spring 154C may act on the piston 156 by compressing the main spring 154A. When the primary pressure is the third lowest setting value (for example, 1.8 MPa), the (relatively large) spring load by the main spring 154A and the (constant) spring load by the main spring 154C may act on the piston 156 by further compressing the main spring 154A. With such a configuration, compared with the case where the main spring is configured by a single elastic body, it is possible to reduce the operating load and suppress the wear between the cam 182 and the pin 184.

However, the main spring 154 does not necessarily have to be configured by a plurality of elastic bodies. For example, the pressure adjusting spacer 188 and the main spring 154B may be removed, and the main spring 154A may be engaged with the pressure adjusting member 186. Further, the main spring 154C may be removed. On the contrary, a plurality of elastic bodies having different lengths according to the cam 182 may be provided. Alternatively, a plurality of elastic bodies that can change their lengths depend on a position of the cam 182 may be provided.

Meanwhile, the regulator 150 according to the present embodiment adopts a configuration in which the pin 184 moves the cam 182 in the first direction D1 or the second direction D2, but the present disclosure is not limited to such a configuration. For example, a configuration may be adopted in which the cam 182 moves the pin 184 in the first direction D1 or the second direction D2 by configuring the pin 184 that abuts on the cam 182 rotating with the rotation of the operating lever 180 to be movable in the first direction D1 or the second direction D2. In that case, the cam 182 and the pin 184 may have an opposite positional relationship. That is, the surface of the cam 182 on which the pin 184 slides, the pin 184, the main spring 154 which is an elastic body, and the valve body 152 may be arranged in this order in the first direction D1 parallel to the first axis AX1. In that case, for example, the pin 184 is arranged on the side facing the pressure adjusting member 186 (that is, at a position advanced in the first direction D1) with respect to the contact surface of the cam 182 with the pin 184. Here, the pin 184 and the pressure adjusting member 186 may be provided to be integrally movable. With such a configuration, the pressure adjusting member 186 can be configured to be movable in the first direction D1 or the second direction D2 in conjunction with the movement of the pin 184 in the first direction D1 or the second direction D2.

[Pressure Adjusting Method]

Hereinafter, a method of changing the secondary pressure in a stepwise manner by using the regulator 150 according to the present embodiment will be described. FIG. 13A is a sectional view of the regulator 150 taken along a plane passing through the first axis AX1 and the second axis AX2 at the low pressure setting time when the secondary pressure is set to a low pressure, and FIG. 13B is a sectional view taken along the line XIIIB-XIIIB in FIG. 13A. At the low pressure setting time, the pin 184 abuts on either the stepped surface 182B1 (in the case of 1.4 MPa), the stepped surface 182B2 (in the case of 1.6 MPa), or the stepped surface 182B3 (in the case of 1.8 MPa). Therefore, the cam 182 exists at a position advanced in the second direction D2 as compared with its position at the high pressure setting time, and accordingly, the pressure adjusting spacer 188 also exists at a position advanced in the second direction D2 as compared with its position at the high pressure setting time. Therefore, since the main spring 154A is relatively long as compared to the high pressure setting time, the main spring 154A exerts a weak elastic force and presses the piston 156 in the first direction D1.

Figure 14B:
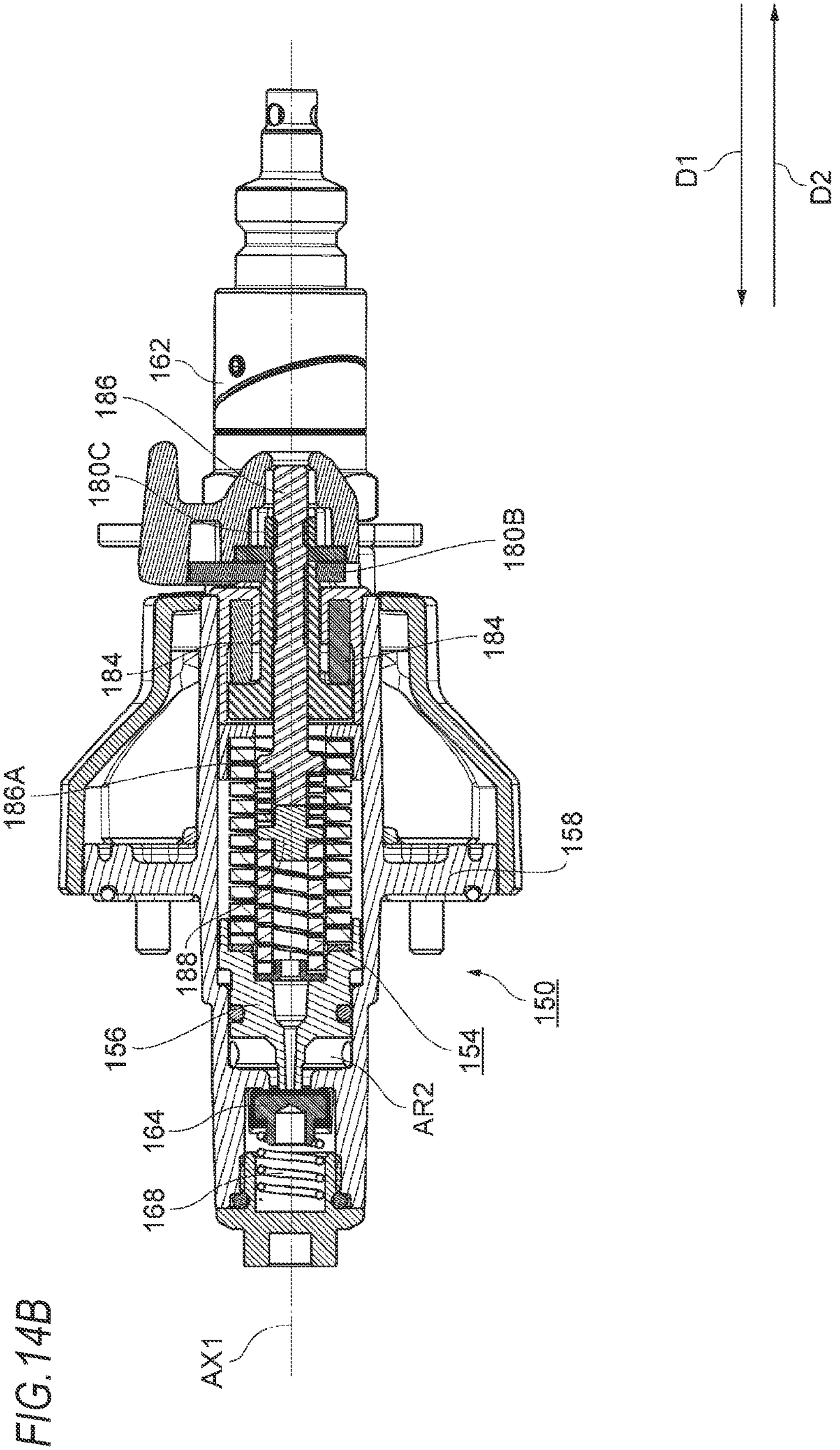
FIG. 14B is a sectional view of a nailing tool according to the embodiment.

FIG. 14A is a sectional view of the regulator 150 taken along the plane passing through the first axis AX1 and the second axis AX2 at the high pressure setting time when the secondary pressure is set to a high pressure, and FIG. 14B is a sectional view taken along the line XIVB-XIVB in FIG. 14A. At the high pressure setting time, the pin 184 abuts on the stepped surface 182B4 (2.3 MPa). Therefore, the cam 182 exists at a position advanced in the first direction D1 as compared with its position at the low pressure setting time, and accordingly, the pressure adjusting spacer 188 also exists at a position advanced in the first direction D1 as compared with its position at the low pressure setting time. Therefore, since the main spring 154A is relatively short as compared to the low pressure setting time, the main spring 154A exerts a strong elastic force and presses the piston 156 in the first direction D1.

Here, a user can easily change the setting pressure to a low pressure or a high pressure by operating the protrusion 180A. As shown in FIG. 15, since the protrusion 180A protrudes in the outer diameter direction from the first end cap 158, a user can generate a large moment with a small force. Therefore, the operating lever 180 and the cam 182 connected to the operating lever 180 can be pivoted around the first axis AX1 with a relatively small operating load.

Additionally, the stepped surfaces 182B1 and 182B4 are provided in a region within 180 degrees with respect to the central axis of the cam 182. Therefore, a user can visually grasp the level of the setting pressure based on the position (angle) of the protrusion 180A.

Further, since the pressure adjusting member 186 is provided so that the relative position with respect to the cam 182 can be changed, it is also possible to easily adjust the variation in the load characteristics based on the individual difference of the main spring 154 or the change with time by changing the relative position of both at the time of manufacturing or the like.

Moreover, the cam 182 is made of a metal having a hardness higher than that of the metal pin 184. Therefore, since the pin 184 can be mainly used as a part that is worn by siding contact, the frequency of replacement of the cam 182 having a complicated shape can be reduced and the pin 184 can be easily replaced, thereby improving the maintenance of the pneumatic tool 110.

Further, also in the regulator 150 according to the present embodiment, similarly to the regulator 50, in the second direction D2 corresponding to the direction approaching the plug 162 serving as the air intake, the valve spring 168, the valve body 152, the piston 156, and the main spring 154 are arranged coaxially on the first axis AX1 in this order. Further, in the regulator 150, the cam 182 and the operating lever 180 are arranged coaxially on the first axis AX1 in this order at positions advanced in the second direction D2 with respect to the main spring 154. As a result, in the first direction D1 (or the second direction D2), the main spring 154 is arranged at a position closer to the plug 162, which is the air intake, than the valve body 152. As a result of such a configuration, the high-pressure air that has entered from the air intake advances in the second direction D2, then makes a U-turn, and advances in the first direction D1 to enter the secondary pressure region AR2. With such a configuration, as in the regulator 50 according to the first embodiment, the total length of the driving tool 110 can be shortened by mounting the regulator 150.

Further, also in the regulator 150 according to the present embodiment, similarly to the regulator 50, the valve body 152 and the main spring 154 are arranged on the first axis AX1, while at least a part of the first flow path CH1 from the air intake to the pressure adjusting mechanism of the regulator 150 has a portion extending in the first direction D1 along the second axis AX2 substantially parallel to the first axis AX1. Further, the portion of the first flow path CH1 extending in the first direction D1 and the region where the main spring 154 is provided partially or completely overlap in the first direction D1 (or the second direction D2). With such a configuration, the total length of the regulator 150 in the first direction D1 (or the second direction D2) can be shortened.

The present application further discloses pneumatic tools described below.

(Supplement A1)

A pneumatic tool includes a drive mechanism configured to be driven by compressed air supplied from an air intake;

an air chamber configured to store the compressed air supplied; and a pressure adjusting mechanism configured to adjust the pressure of the compressed air in the air chamber, and the pressure adjusting mechanism includes a valve body configured to open and close a flow path that communicates the air intake and the air chamber with each other;

an elastic body configured to exert an urging force to the valve body in a direction of opening the flow path;

a support part configured to support an end of the elastic body;

a pressure receiving member configured to receive air pressure in the air chamber and press the elastic body in a direction of closing the flow path; and a load reducing mechanism capable of switching the urging force of the elastic body acting on the valve body between a normal state and a load reduction state in which the urging force smaller than the normal state is exerted.

According to the pneumatic tool described in Supplement A1, it is possible to provide a pressure regulator capable of reducing the operating load of the pressure adjusting mechanism and a pneumatic tool provided with the pressure regulator.

(Supplement A2)

In the pneumatic tool of Supplement A1, the support part moves when the normal state is switched to the load reducing state.

(Supplement A3)

In the pneumatic tool of Supplement A1 or Supplement A2, the pneumatic tool further includes an operation input part by which a user can operate the urging force of the elastic body, and the normal state is switched to the load reducing state in conjunction with the operation input to the operation input part.

(Supplement A4)

In the pneumatic tool of any one of Supplement A1 to Supplement A3, the pressure receiving member is a piston component that is arranged between the valve body and the elastic body and presses the valve body by the elastic body.

(Supplement A5)

In the pneumatic tool of Supplement A4, the pneumatic tool further includes an inner cylindrical portion formed in a cylindrical shape, the support part is an outer cylindrical portion that is externally fitted to the inner cylindrical portion and is slidable along the inner cylindrical portion, and the elastic body penetrates the inner cylindrical portion and faces the piston component.

(Supplement A6)

In the pneumatic tool of any one of Supplement A1 to Supplement A5, the valve body and the elastic body are arranged on a first axis, at least a part of a flow path from the air intake to the pressure adjusting mechanism extends along a second axis substantially parallel to the first axis, and the elastic body is arranged at a position closer to the air intake than the valve body.

(Supplement A7)

In the pneumatic tool of any one of Supplement A1 to Supplement A6, the pneumatic tool includes a load release region that is a closed space facing the support part and defined on the side opposite to the valve body with the support part interposed therebetween;

a pressurized flow path that can introduce compressed air on the upstream side of the valve body into the load release region;

a depressurized flow path that can discharge the compressed air introduced into the load release region to the outside of the pressure adjusting mechanism; and a load release valve configured to open and close the depressurized flow path.

(Supplement A8)

In the pneumatic tool of Supplement A7, the pneumatic tool further includes an operation input part by which a user can operate the urging force of the elastic body, the load release valve is opened in response to the operation of the operation input part, and the support part moves to the side opposite to the side where the valve body is located when the load release region is depressurized.

(Supplement A9)

In the pneumatic tool of any one of Supplement A1 to Supplement A6, the pneumatic tool is a driving tool for striking out a fastener.

(Supplement A10)

A pressure regulator for adjusting the pressure of compressed air includes a valve body configured to open and close a flow path that communicates an air intake for supplying compressed air and an air outlet for taking out the pressure-adjusted compressed air, an elastic body configured to exert an urging force to the valve body in a direction of opening the flow path, and a pressure receiving member configured to receive air pressure on the downstream side of the valve body and press the elastic body in a direction in which the valve body closes the flow path, and the pressure regulator further includes a load reducing mechanism capable of switching the urging force of the elastic body acting on the valve body between a normal state and a load reduction state in which the urging force smaller than the normal state is exerted.

(Supplement B1)

A pneumatic tool includes a drive mechanism configured to be driven by compressed air supplied from an air intake;

an air chamber configured to store the compressed air supplied; and a pressure adjusting mechanism configured to adjust the pressure of the compressed air in the air chamber, the pressure adjusting mechanism includes a valve body configured to open and close a flow path that communicates the air intake and the air chamber with each other;

an elastic body configured to exert an urging force to the valve body in a direction of opening the flow path; and a pressure receiving member configured to receive air pressure in the air chamber and press the elastic body in a direction of closing the flow path, the pressure receiving member is provided with a second pressure receiving surface that receives air pressure in the air chamber and is pressed in a direction of closing the flow path, and the pressure receiving member or the member in contact with the pressure receiving member is provided with a third pressure receiving surface that is formed smaller than the second pressure receiving surface, receives air pressure on the upstream side of the valve body and is pressed in a direction of opening the flow path.

According to the pneumatic tool described in Supplement B1, it is possible to provide a pneumatic tool in which the secondary pressure is not easily affected even when the primary pressure fluctuates.

(Supplement B2)

In the pneumatic tool of Supplement B1, the valve body and the elastic body are arranged on a first axis, and at least a part of a flow path from the air intake to the pressure adjusting mechanism extends along a second axis substantially parallel to the first axis.

(Supplement B3)

In the pneumatic tool of Supplement B2, a bypass flow path for applying air pressure on the upstream side of the valve body to the third pressure receiving surface is formed to straddle the second axis and the first axis.

(Supplement B4)

In the pneumatic tool of any one of Supplement B1 to Supplement B3, the pressure receiving member is a piston component that is arranged between the valve body and the elastic body and presses the valve body by the elastic body.

(Supplement B5)

In the pneumatic tool of any one of Supplement B1 to Supplement B4, the pneumatic tool further includes an inner cylindrical portion that can come into contact with the pressure receiving member and an outer cylindrical portion that is slidable along the inner cylindrical portion, and the third pressure receiving surface is provided between the outer cylindrical portion and the inner cylindrical portion.

(Supplement B6)

In the pneumatic tool of any one of Supplement B1 to Supplement B5, a flow path from the air intake to the pressure adjusting mechanism has a portion extending in a first direction, and at least a part thereof overlaps, in the first direction, with a region where the elastic body is provided.

(Supplement B7)

In the pneumatic tool of any one of Supplement B1 to Supplement B6, the pneumatic tool is a driving tool for striking out a fastener.

(Supplement C1)

A pneumatic tool includes a drive mechanism configured to be driven by compressed air supplied from an air intake; an air chamber configured to store the compressed air supplied; and a pressure adjusting mechanism configured to adjust the pressure of the compressed air in the air chamber, and the pressure adjusting mechanism includes a valve body configured to open and close a flow path that communicates the air intake and the air chamber with each other;

an elastic body configured to exert an urging force to the valve body to open the flow path;

a pressure receiving member configured to receive air pressure in the air chamber and exert an urging force in a direction of closing the flow path to the elastic body, and an urging force adjusting member configured to be able to change an urging force of the elastic body acting on the valve body in a stepwise manner.

(Supplement C2)

A pneumatic tool includes a drive mechanism configured to be driven by compressed air supplied from an air intake;

an air chamber configured to store the compressed air supplied; and a pressure adjusting mechanism configured to adjust the pressure of the compressed air in the air chamber, and the pressure adjusting mechanism includes a valve body configured to open and close a flow path that communicates the air intake and the air chamber with each other;

an elastic body configured to exert an urging force to the valve body to open the flow path;

a pressure receiving member configured to receive air pressure in the air chamber and exert an urging force in a direction of closing the flow path to the elastic body, and an urging force adjusting member configured to be able to change the length of the elastic body in a stepwise manner.

Meanwhile, in the pneumatic tool described in Supplement C1 or Supplement C2, the urging force adjusting member may be a cam.

(Supplement C3)

In the pneumatic tool of Supplement C1 or Supplement C2, the urging force adjusting member (or cam) has a rotation axis parallel to a central axis of the elastic body.

(Supplement C4)

In the pneumatic tool of any one of Supplement C1 to Supplement C3, the pneumatic tool further includes a slidable member on a surface of the urging force adjusting member (or cam).

(Supplement C5)

In the pneumatic tool of any one of Supplement C1 to Supplement C4, the pneumatic tool includes a second urging force adjusting member configured to be able to change an urging force of the elastic body acting on the valve body.

The second urging force adjusting member may be an adjusting member configured to be able to further change the length of the elastic body by changing its position with respect to the urging force adjusting member (or cam).

Further, the urging force adjusting member (or cam) may have a female screw, and the second urging force adjusting member may have a male screw that is screwed with the female screw and may be configured to be able to further change the length of the elastic body by changing its position with respect to the urging force adjusting member (cam).

(Supplement C6)

In the pneumatic tool of any one of Supplement C1 to Supplement C5, the pneumatic tool further includes an end cap surrounding at least the pressure adjusting mechanism, and an operation part for rotating the cam, and the operation part has a portion protruding in an outer diameter direction from the end cap as viewed from a direction parallel to the rotation axis of the urging force adjusting member (or cam).

(Supplement C7)

In the pneumatic tool of any one of Supplement C1 to Supplement C6, the elastic body includes a plurality of elastic bodies for exerting an urging force on the valve body to open the flow path, and the urging force adjusting member is configured to be able to change an urging force only a part of the plurality of elastic bodies in a stepwise manner.

(Supplement C8)

In the pneumatic tool of any one of Supplement C1 to Supplement C7, the elastic body is arranged at a position closer to the air intake than the valve body.

(Supplement C9)

In the pneumatic tool of Supplement C8, the valve body and the elastic body are arranged on a first axis, and at least a part of a flow path from the air intake to the pressure adjusting mechanism extends along a second axis substantially parallel to the first axis.

(Supplement C10)

In the pneumatic tool of Supplement C8 or Supplement C9, a flow path from the air intake to the pressure adjusting mechanism has a portion extending in a first direction, and at least a part thereof overlaps, in the first direction, with a region where the elastic body is provided.

(Supplement C11)

In the pneumatic tool of any one of Supplement C8 to Supplement C10, the pressure receiving member is a piston component that is arranged between the valve body and the elastic body and presses the valve body by the elastic body.

(Supplement C12)

In the pneumatic tool of any one of Supplement C8 to Supplement C11, the pneumatic tool further includes an adjustment unit configured to adjust an urging force exerted by the elastic body.

(Supplement C13)

In the pneumatic tool of any one of Supplement C8 to Supplement C12, the elastic body is configured to exert an urging force in a first direction to the valve body, the pressure receiving member is configured to exert an urging force in a second direction opposite to the first direction to the valve body, and a flow path from the air intake to the pressure adjusting mechanism has a flow path for advancing compressed air in the first direction.

(Supplement C14)

In the pneumatic tool of any one of Supplement C8 to Supplement C13, the pneumatic tool is a driving tool for striking out a fastener.

(Supplement C15)

In the pneumatic tool of Supplement C4, the valve body and the elastic body are arranged on a first axis, and the pin, the cam, the elastic body, and the valve body are configured such that the pin, the surface of the cam on which the pin slides, the elastic body, and the valve body are arranged in this order in a first direction parallel to the first axis.

(Supplement C16)

In the pneumatic tool of Supplement C4, the valve body and the elastic body are arranged on a first axis, and the pin, the cam, the elastic body, and the valve body are configured such that the surface of the cam on which the pin slides, the pin, the elastic body, and the valve body are arranged in this order in a first direction parallel to the first axis.

(Supplement C17)

In the pneumatic tool of Supplement C4, the pin is made of a first metal, and the cam is made of a second metal having a hardness higher than that of the first metal.

(Supplement C18)

In the pneumatic tool of Supplement C1 or Supplement C2, the pneumatic tool further includes a coil spring for exerting an urging force to the valve body in a direction of closing the flow path, and the urging force adjusting member (or cam) has a rotation axis coaxial with a central axis of the coil spring.

The invention claimed is:

1. A pneumatic tool comprising:

a drive mechanism configured to be driven by compressed air supplied from an air intake;

an air chamber configured to store the compressed air supplied to drive the drive mechanism;

a pressure adjusting mechanism configured to adjust a primary pressure of the compressed air supplied into the air chamber to a secondary pressure, the primary pressure being a pressure of the compressed air supplied from the air intake;

a first flow path that is in a primary pressure region of the pressure adjusting mechanism, the first flow path being in communication with the air intake; and a second flow path that is in a secondary pressure region of the pressure adjusting mechanism, the second flow path being in communication with the air chamber, wherein the pressure adjusting mechanism comprises:

a valve chamber, which is in the primary pressure region, configured to connect the first flow path and the second flow path;

a valve body provided in the valve chamber and configured to move in directions for opening and closing the valve chamber and the second flow path;

an elastic body configured to exert a first urging force to the valve body in the direction for opening the valve chamber and the second flow path;

a valve spring provided on the valve body and configured to exert a second urging force to the valve body in the direction for closing the valve chamber and the second flow path; and a pressure receiving member configured to receive air pressure in the air chamber and exert a third urging force in a direction to close the first flow path, wherein the elastic body is arranged at a position closer to the air intake than the valve body, wherein the elastic body, the pressure receiving member, the valve body, and the valve spring are provided on a first axis, wherein the elastic body is configured to press the valve body via the pressure receiving member, and wherein a part of the first flow path extends along a second axis parallel to the first axis.

2. The pneumatic tool according to claim 1, wherein the pressure receiving member is a piston component that is arranged between the valve body and the elastic body and that presses the valve body by being urged by the elastic body.

3. The pneumatic tool according to claim 1, further comprising an adjustment unit configured to adjust an amount of the first urging force exerted by the elastic body to the valve body.

4. The pneumatic tool according to claim 1, wherein the elastic body is configured to exert the first urging force to the valve body in a first direction, wherein the valve spring is configured to exert the second urging force to the valve body in a second direction opposite to the first direction, and wherein a portion of the first flow path from the air intake to the pressure adjusting mechanism advances compressed air in the first direction.

5. The pneumatic tool according to claim 1, wherein the pneumatic tool is a fastener driving tool.

6. The pneumatic tool according to claim 1, wherein:

when, in an equilibrium state, the air pressure in the air chamber becomes a predetermined pressure, the valve body closes the first flow path by the second urging force of the valve spring, and when the air pressure in the air chamber becomes lower than the predetermined pressure, the valve body opens the first flow path by the first urging force of the elastic body.

* * * * *